(12) United States Patent
Nakagawa et al.

(10) Patent No.: US 9,912,000 B2
(45) Date of Patent: Mar. 6, 2018

(54) FUEL CELL, MANUFACTURING METHOD THEREOF, ELECTRONIC APPARATUS, ENZYME-IMMOBILIZED ELECTRODE, MANUFACTURING METHOD THEREOF, WATER-REPELLENT AGENT, AND ENZYME IMMOBILIZING MATERIAL

(75) Inventors: Takaaki Nakagawa, Kanagawa (JP); Hideyuki Kumita, Kanagawa (JP); Masaya Kakuta, Kanagawa (JP); Hideki Sakai, Kanagawa (JP); Hiroki Mita, Kanagawa (JP); Yoshio Goto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1018 days.

(21) Appl. No.: 12/744,579

(22) PCT Filed: Dec. 4, 2008

(86) PCT No.: PCT/JP2008/072058
§ 371 (c)(1),
(2), (4) Date: May 25, 2010

(87) PCT Pub. No.: WO2009/072564
PCT Pub. Date: Jun. 11, 2009

(65) Prior Publication Data
US 2010/0248042 A1 Sep. 30, 2010

(30) Foreign Application Priority Data
Dec. 7, 2007 (JP) .................. P2007-317039

(51) Int. Cl.
*H01M 8/16* (2006.01)
*H01M 4/86* (2006.01)
(Continued)

(52) U.S. Cl.
CPC ............ *H01M 8/16* (2013.01); *H01M 4/8605* (2013.01); *H01M 4/8892* (2013.01); *H01M 4/90* (2013.01);
(Continued)

(58) Field of Classification Search
CPC .... H01M 8/16; H01M 4/9008; H01M 4/8605; H01M 4/8892; H01M 4/90; H01M 8/04119
(Continued)

(56) References Cited

U.S. PATENT DOCUMENTS 5,441,822 A * 8/1995 Yamashita et al. ........... 429/508
5,474,857 A * 12/1995 Uchida et al. ................ 429/481
(Continued)

FOREIGN PATENT DOCUMENTS

| JP | 06-188008 | 7/1994 |
|---|---|---|
| JP | 2000-133297 | 5/2000 |

(Continued)

OTHER PUBLICATIONS

JP 2001023647 English Translation, aipn/online translation Apr. 9, 2013.*
(Continued)

*Primary Examiner* — Jimmy K Vo
(74) *Attorney, Agent, or Firm* — K&L Gates LLP

(57) ABSTRACT

In the case in which a fuel cell has a structure in which a cathode (2) and an anode (1) are opposed with the intermediary of an electrolyte layer (3) and the cathode (2) is formed of an electrode to which an oxygen reductase and so on is immobilized and this electrode has pores inside, at least part of the surface of this electrode is rendered water repellent. For example, the surface of the electrode is rendered water repellent by forming a water-repellent agent on the surface of this electrode. Thereby, in the case in which the cathode
(Continued)

is formed of an electrode to which an enzyme is immobilized and this electrode has pores inside, a fuel cell that can stably achieve a high current value by optimization of the amount of water contained in the cathode and a manufacturing method thereof are provided.

14 Claims, 22 Drawing Sheets

(51) Int. Cl.
  *H01M 4/88* (2006.01)
  *H01M 4/90* (2006.01)
  *H01M 8/04119* (2016.01)

(52) U.S. Cl.
  CPC ............... *H01M 8/04119* (2013.01); *H01M 2004/8689* (2013.01); *Y02E 60/527* (2013.01); *Y02P 70/56* (2015.11)

(58) Field of Classification Search
  USPC ............... 429/410, 414, 450, 401, 531, 535
  See application file for complete search history.

(56) References Cited

U.S. PATENT DOCUMENTS

| | | | |
|---|---|---|---|
| 2001/0055710 A1* | 12/2001 | Saito et al. | ............ 429/34 |
| 2004/0028959 A1* | 2/2004 | Horiuchi et al. | ............ 429/12 |
| 2004/0091757 A1* | 5/2004 | Wang et al. | ............ 429/19 |
| 2005/0053825 A1 | 3/2005 | Sakai et al. | |
| 2006/0105418 A1 | 5/2006 | Sato et al. | |
| 2007/0077478 A1* | 4/2007 | Nguyen et al. | ............ 429/33 |
| 2007/0218345 A1 | 9/2007 | Sakai et al. | |
| 2007/0224466 A1 | 9/2007 | Nakagawa et al. | |
| 2010/0009241 A1 | 1/2010 | Sato et al. | |

FOREIGN PATENT DOCUMENTS

| | | | | |
|---|---|---|---|---|
| JP | 2001023647 A | * | 1/2001 | ............ H01M 4/86 |
| JP | 2003-077494 | | 3/2003 | |
| JP | 2003-282124 | | 10/2003 | |
| JP | 2004-71559 | | 3/2004 | |
| JP | 2004-207208 | | 7/2004 | |
| JP | 2004207208 A | * | 7/2004 | ............ H01M 4/86 |
| JP | 2005-13210 | | 1/2005 | |
| JP | 2005-285549 | | 10/2005 | |
| JP | 2005-310613 | | 11/2005 | |
| JP | 2006-24555 | | 1/2006 | |
| JP | 2006-49215 | | 2/2006 | |
| JP | 2006-066198 | | 3/2006 | |
| JP | 2006-93090 | | 4/2006 | |
| JP | 2006-127957 | | 5/2006 | |
| JP | 2006-156354 | | 6/2006 | |
| JP | 2007-12281 | | 1/2007 | |
| JP | 2007-35437 | | 2/2007 | |
| JP | 2007-87627 | | 4/2007 | |
| JP | 2007-218795 | | 8/2007 | |
| JP | 2007-257983 | | 10/2007 | |
| JP | 2007-280944 | | 10/2007 | |
| JP | 2007257983 A | * | 10/2007 | |
| JP | 2007280944 A | * | 10/2007 | |

OTHER PUBLICATIONS

JP 2004207208 English Translation, aipn/online translation Apr. 9, 2013.*
JP 2007280944 English Translation, aipn/online translation Apr. 9, 2013.*
JP 2007257983 English Translation, aipn/online translation Apr. 22, 2013.*
Translation of JP 2001023647, Apr. 10, 2013 via Japan Patent Office.*
International Preliminary Report on Patentability dated Aug. 10, 2010 corresponding to Appln. No. PCT/JP2008/072058.
Written Opinion dated Aug. 10, 2010 corresponding to Appln. No. PCT/JP2008/072058.
Chinese Office Action dated Jul. 11, 2013 in corresponding Chinese Patent Application No. 2009-80126243.7.
Japanese Office Action dated Sep. 10, 2013 in corresponding Japanese Patent Application No. 2008-182221.
Japanese Office Action dated Jun. 11, 2013 in corresponding Japanese Patent Application No. 2008-182221.

* cited by examiner

F I G . 3
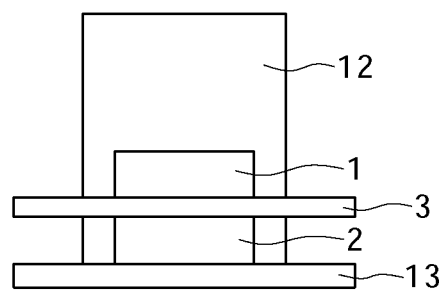
F I G . 4
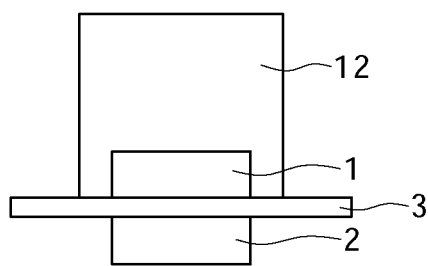
F I G . 5
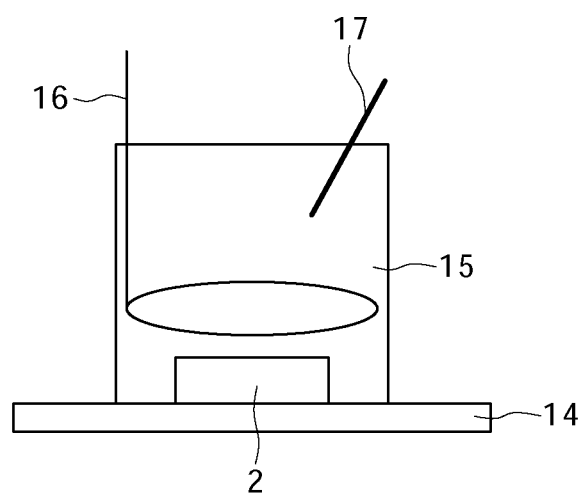

F I G . 1 7
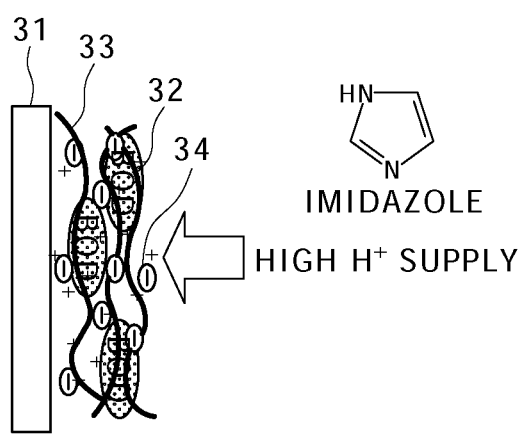
F I G . 1 8
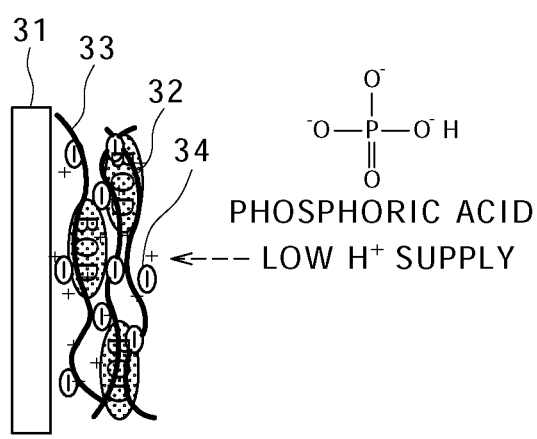

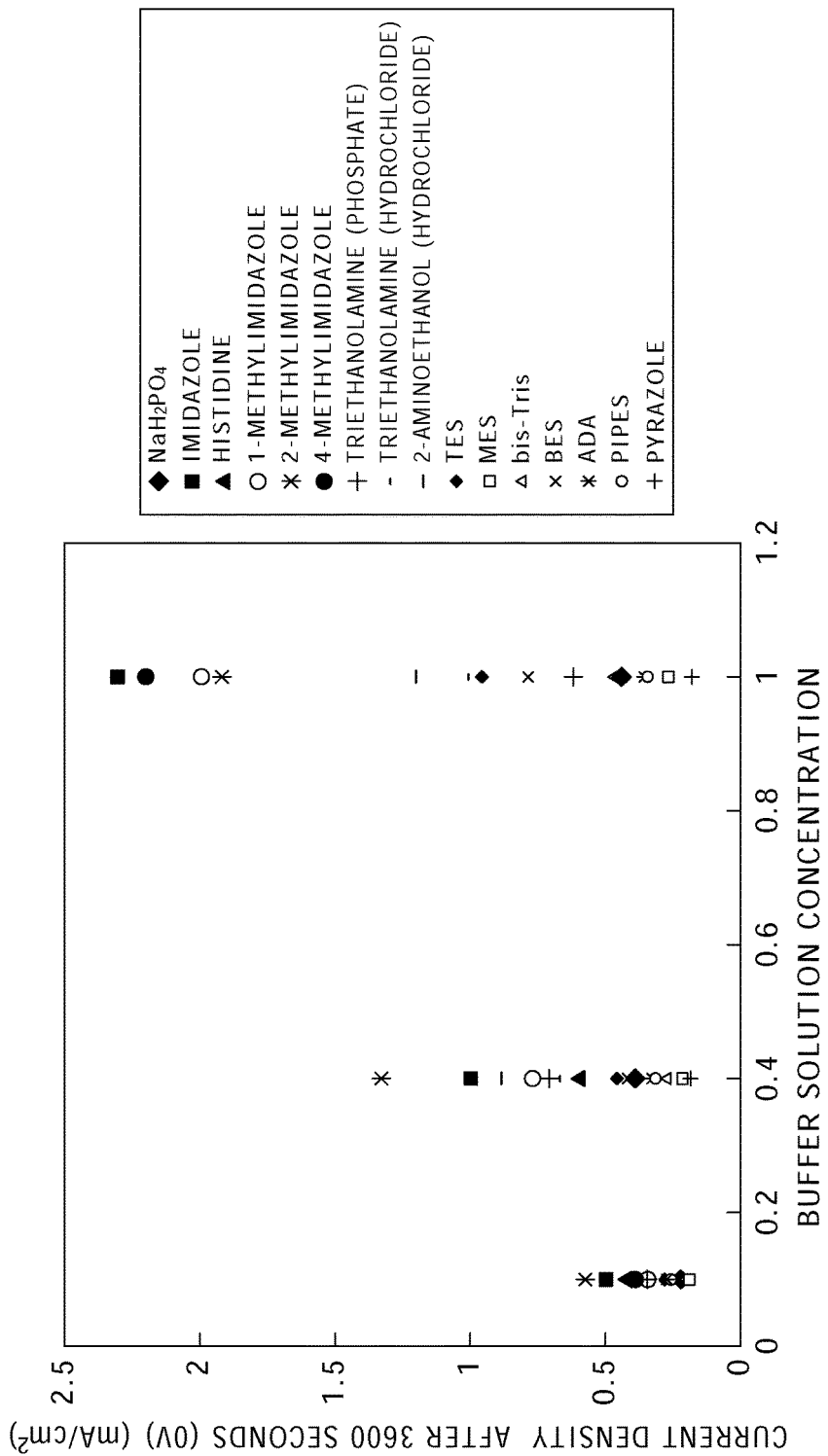

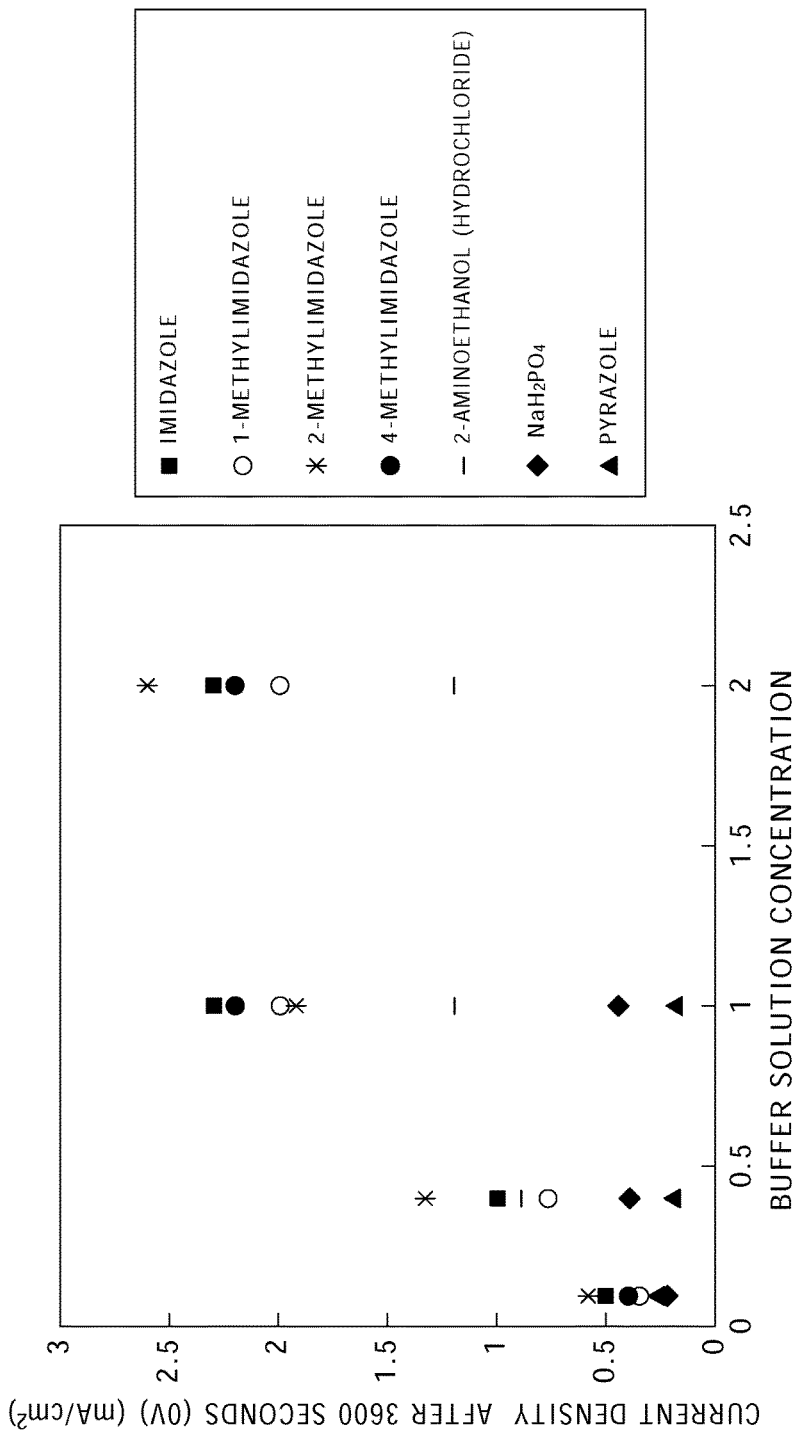

FIG.23
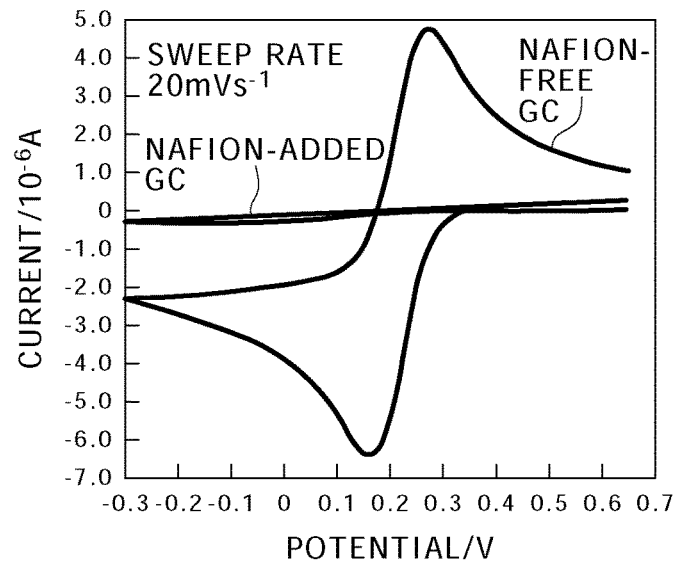
(A)
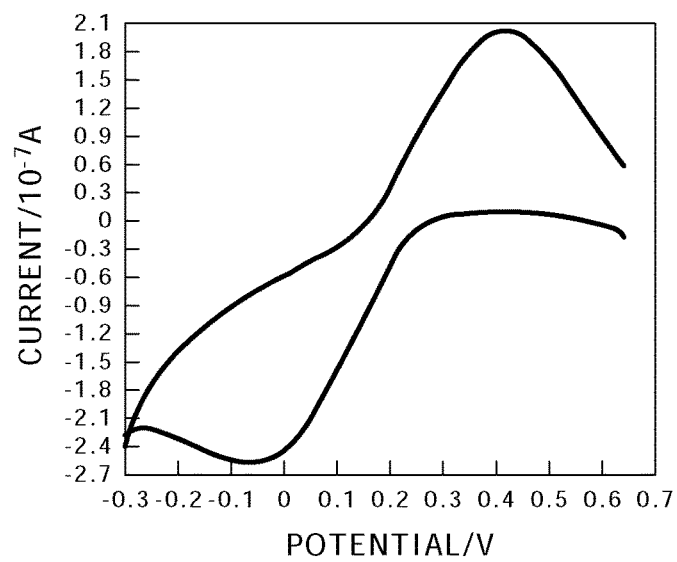
(B)

FIG. 27
(A)
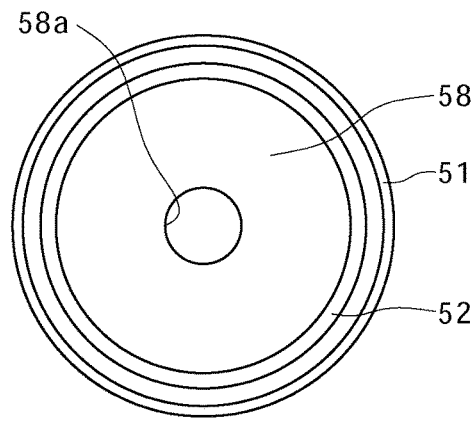
(B)
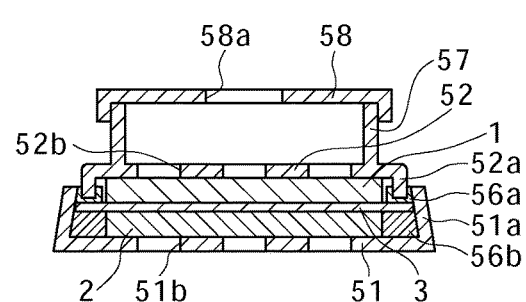
(C)
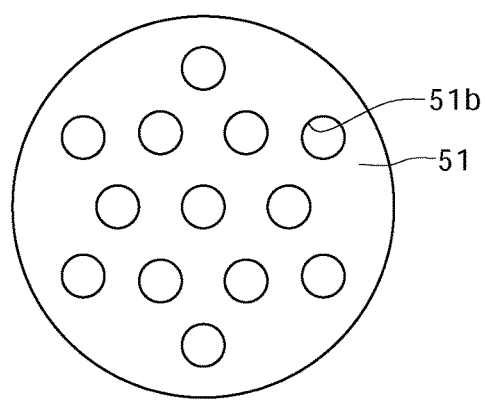

F I G . 2 9
(A) 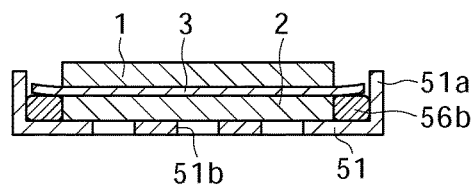
(B) 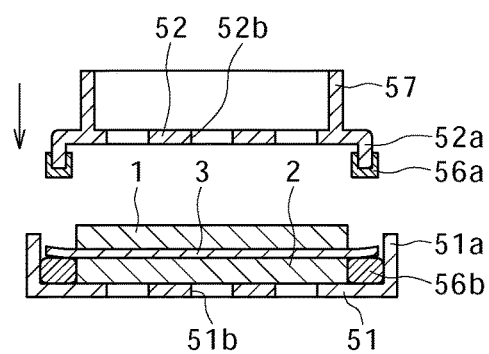
(C) 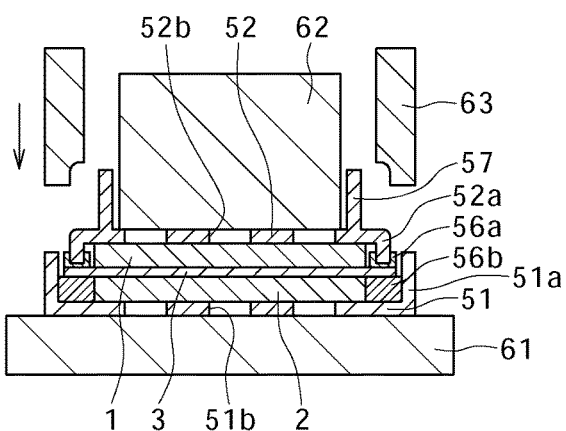
(D) 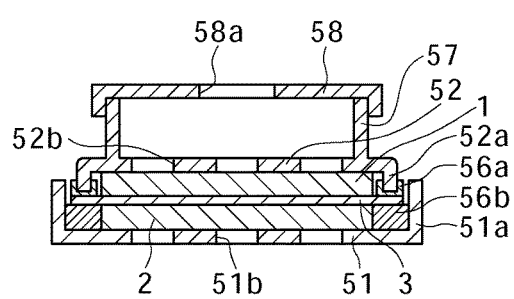

FIG. 34
(A)
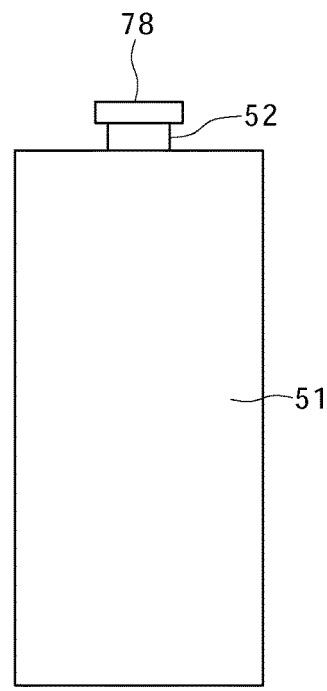
(B)
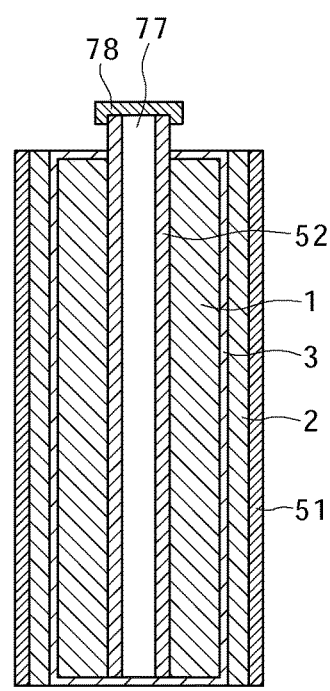

FUEL CELL, MANUFACTURING METHOD THEREOF, ELECTRONIC APPARATUS, ENZYME-IMMOBILIZED ELECTRODE, MANUFACTURING METHOD THEREOF, WATER-REPELLENT AGENT, AND ENZYME IMMOBILIZING MATERIAL

CROSS REFERENCE TO RELATED APPLICATIONS

The present application is a national stage of International Application No. PCT/JP2008/072058 filed on Dec. 4, 2008 and claims priority to Japanese Patent Application No. 2007-317039 filed on Dec. 7, 2007 the disclosures of which are incorporated herein by reference.

BACKGROUND

This invention relates to a fuel cell, a manufacturing method thereof, electronic apparatus, an enzyme-immobilized electrode, a manufacturing method thereof, a water-repellent agent, and an enzyme immobilizing material, and particularly is suitable to be applied to a biofuel cell employing an enzyme and various kinds of electronic apparatus employing this biofuel cell as the power supply.

The fuel cell has a structure in which a cathode (oxidant electrode) and an anode (fuel electrode) are opposed with the intermediary of an electrolyte (proton conductor). In the conventional fuel cells, the fuel (hydrogen) supplied to the anode is oxidized to be separated into electrons and protons ($H^+$). The electron is passed to the anode and the $H^+$ passes through the electrolyte to move to the cathode. At the cathode, this $H^+$ reacts with oxygen supplied from the external and the electron sent from the anode via an external circuit, to produce water ($H_2O$).

As just described, the fuel cell is a high-efficiency electricity generating device that directly converts the chemical energy possessed by the fuel to electrical energy, and can draw the chemical energy possessed by fossil energy such as natural gas, oil, and coal as electrical energy irrespective of the use place and the use time and with high conversion efficiency. Therefore, conventionally the research and development of the fuel cell as the use application for large-scale generation of electricity and so on have been actively carried out. For example, there are track records of demonstrating that a fuel cell is mounted in a space shuttle and water for the crew can be replenished simultaneously with electrical power, and that the fuel cell is a clean electricity generating device.

Furthermore, in recent years, a fuel cell that exhibits a comparatively-low operating temperature range from the room temperature to about 90° C., such as the solid polymer fuel cell, has been developed and is attracting attention. Thus, seeking is being made for not only the use application for large-scale generation of electricity but also application to small-size systems such as the driving power supply of the car and the portable power supply of the personal computer and mobile apparatus.

As just described, the fuel cell will have a wide range of use application from large-scale generation of electricity to small-scale generation of electricity, and is attracting much attention as a high-efficiency electricity generating device. However, for the fuel cell, generally natural gas, oil, coal, or the like is converted to a hydrogen gas by a reformer and used as the fuel, and thus the limited resources are consumed. In addition, there are various problems that the fuel cell needs to be heated to a high temperature and requires a catalyst of an expensive noble metal such as platinum (Pt), and so on. Furthermore, even if a hydrogen gas or methanol is directly used as the fuel, care needs to be taken in handling it.

Thus, there has been made a proposal in which attention is paid to the fact that the biological metabolism carried out in living organisms is a high-efficiency energy conversion mechanism and it is applied to the fuel cell. Breathing, photosynthesis, and so on carried out in somatic cells of microorganisms are included in the term biological metabolism here. The biological metabolism has both of a feature that the electricity generation efficiency is extremely high and a feature that the reaction proceeds under a moderate condition at about a room temperature.

For example, the breathing is the following mechanism. Specifically, nutrients such as sugar, fat, and protein are captured into a microorganism or a cell and the chemical energy of them is converted to redox energy, i.e. electrical energy, by reducing nicotinamide adenine dinucleotide ($NAD^+$) to reduced nicotinamide adenine dinucleotide (NADH) in the process of production of carbon dioxide ($CO_2$) via the glycolytic system and the citric acid (TCA) cycle having a number of enzyme reaction steps. Furthermore, in the electron transport chain, the electrical energy of these NADH is directly converted to electrical energy of the proton gradient and oxygen is reduced to produce water. The electrical energy obtained therein produces adenosine triphosphate (ATP) from adenosine diphosphate (ADP) via an ATP synthase, and this ATP is utilized for the reaction necessary for the growth of the microorganism or the cell. Such energy conversion is carried out in the cytosol and the mitochondrion.

Furthermore, the photosynthesis is a mechanism in which water is oxidized to produce oxygen in the process of capturing light energy and converting it to electrical energy by reducing nicotinamide adenine dinucleotide phosphate ($NADP^+$) to reduced nicotinamide adenine dinucleotide phosphate (NADPH) via the electron transport chain. This electrical energy captures $CO_2$ and is utilized for carbon fixation, and is utilized for carbohydrate synthesis.

As a technique for utilizing the above-described biological metabolism for the fuel cell, a microbial cell has been reported in which electrical energy generated in a microorganism is drawn outside the microorganism via an electron mediator and this electron is passed to the electrode to thereby obtain a current (refer to e.g. Japanese Patent Laid-open No. 2000-133297).

However, in microorganisms and cells, not only the intended reaction such as conversion from chemical energy to electrical energy but also many unnecessary reactions exist. Therefore, in the above-described method, electrical energy is consumed by undesired reactions and thus sufficient energy conversion efficiency is not exerted.

Thus, a fuel cell (biofuel cell) that carries out only the desired reaction by using an enzyme has been proposed (refer to e.g. Japanese Patent Laid-open No. 2003-282124, Japanese Patent Laid-open No. 2004-71559, Japanese Patent Laid-open No. 2005-13210, Japanese Patent Laid-open No. 2005-310613, Japanese Patent Laid-open No. 2006-24555, Japanese Patent Laid-open No. 2006-49215, Japanese Patent Laid-open No. 2006-93090, Japanese Patent Laid-open No. 2006-127957, Japanese Patent Laid-open No. 2006-156354, Japanese Patent Laid-open No. 2006-12281, Japanese Patent Laid-open No. 2007-35437, and Japanese Patent Laid-open No. 2007-87627). This biofuel cell breaks down the fuel by the enzyme to separate the fuel into protons and electrons, and one that employs an alcohol such as methanol or ethanol or a monosaccharide such as glucose as the fuel has been developed.

SUMMARY

For the cathode of the above-described biofuel cell, generally a material having pores, such as porous carbon, is used for supply of oxygen. However, in the case of the cathode composed of such a material having pores, the pores inside the cathode are possibly filled with water that moves from the fuel solution supplied to the anode toward the cathode side via the electrolyte, water produced by the reaction of the $H^+$ supplied from the anode via the electrolyte with oxygen supplied from the external and the electron sent from the anode via the external circuit, water that comes out from the electrolyte including a buffer solution due to the osmotic pressure, and so on. As a result, the inside of the cathode is possibly submerged. If the inside of the cathode is thus submerged, it becomes difficult to supply oxygen to the cathode. Thus, the current obtained from the biofuel cell is greatly reduced. Therefore, it is important to manage the amount of water included in the cathode. However, an effective method therefor has not been proposed in the past.

Thus, a problem to be solved by this invention is to, if the cathode is formed of an electrode to which an enzyme is immobilized and this electrode has pores inside, provide a fuel cell that can stably achieve a high current value by optimization of the amount of water included in the cathode, a manufacturing method thereof, an enzyme-immobilized electrode suitable to be used as the cathode of this fuel cell, a manufacturing method thereof, and a water-repellent agent suitable to be used for this enzyme-immobilized electrode.

Another problem to be solved by this invention is to provide electronic apparatus employing an excellent fuel cell like the above-described one.

The present inventors have made studies strenuously in order to solve the above-described problems. As a result, the present inventors have found that, if the cathode is formed of an electrode to which an enzyme is immobilized and this electrode is one having pores inside, such as porous carbon, the amount of water included in this cathode can be maintained in the optimum range by rendering at least part of the surface of this electrode including the inner surfaces of the pores water repellent, and have reached the devisal of this invention. Here, because generally the enzyme immobilized to the electrode and other immobilization substances have high hydrophilicity, it is very difficult to give water repellency to the electrode while keeping these states. Furthermore, there is a problem that, if such hydrophilic enzyme and other immobilization substances are immobilized to the electrode rendered water repellent, the water-repellent surface is modified to a hydrophilic surface. To address these problems, the present inventors have newly developed a technique for rendering the surface of the electrode including the inner surfaces of the pores inside the electrode water repellent while keeping the activity of the enzyme and so on.

Specifically, in order to solve the above-described problems, a first invention is a fuel cell having a structure in which a cathode and an anode are opposed with the intermediary of a proton conductor. The cathode is formed of an electrode to which an enzyme is immobilized, and the electrode has a pore inside. The fuel cell is characterized in that at least part of the surface of the electrode is rendered water repellent.

A second invention is a manufacturing method of a fuel cell having a structure in which a cathode and an anode are opposed with the intermediary of a proton conductor. The cathode is formed of an electrode to which an enzyme is immobilized, and the electrode has a pore inside. The manufacturing method is characterized in that at least part of the surface of the electrode is rendered water repellent.

A third invention is electronic apparatus employing one or a plurality of fuel cells. At least one of the fuel cells has a structure in which a cathode and an anode are opposed with the intermediary of a proton conductor. The cathode is formed of an electrode to which an enzyme is immobilized, and the electrode has a pore inside. The electronic apparatus is characterized in that at least part of the surface of the electrode is rendered water repellent.

In the first to third inventions, in order to render the surface of the electrode of the cathode water repellent, for example, a water-repellent agent containing a water-repellent material is formed on the surface of this electrode. For example, this water-repellent agent is applied on the surface of the electrode, or the electrode is dipped (immersed) in the water-repellent agent. As this water-repellent agent, various agents can be used and are selected according to need. For example, an agent made by dispersing a water-repellent material, especially a water-repellent material in the form of microparticles, in an organic solvent can be used. The ratio of the water-repellent material in the water-repellent agent may be extremely low. As this water-repellent agent, preferably an agent that contains at least a water-repellent material and an organic solvent in which the solubility of an enzyme is sufficiently low, e.g. the solubility is equal to or lower than 10 mg/ml, preferably equal to or lower than 1 mg/ml, is used. As the organic solvent, e.g. methyl isobutyl ketone or the like can be used. In this water-repellent agent, a binder and so on is contained in addition to the water-repellent material and the organic solvent according to need. Although various substances can be used as this binder, e.g. poly(vinyl butyral) can be used. The ratio of the binder in the water-repellent agent is e.g. 0.01 to 10%. However, the ratio is not limited thereto. If the binder is a substance having water repellency, such as polyvinylidene difluoride (PVDF), this binder itself can be used as the water-repellent material. Although various substances can be used as the water-repellent material, e.g. a carbon-based material, preferably a carbon powder, can be used. As the carbon powder, e.g. graphite such as natural graphite, activated carbon, a carbon nanofiber (vapor grown carbon fiber), which is used as a dopant material in a lithium ion cell or the like, ketjen black, or the like can be used. As the material having pores, used for the electrode, generally a porous material is used, and a carbon-based material such as porous carbon, a carbon pellet, carbon felt, or carbon paper is frequently used. However, another material may be used. Also as the material of the anode, similar materials can be used.

Typically, the enzyme is immobilized to the surface of the electrode of the cathode, and thereafter the water-repellent agent containing the water-repellent material is formed on the surface of this electrode to thereby render the surface of the electrode water repellent. As already described, it is extremely difficult thus far to render the surface of this electrode water repellent while maintaining the activity of the enzyme immobilized to the surface of the electrode.

For example, this fuel cell is so configured that a fuel solution is in contact with part of the cathode, or is so configured that a fuel solution is in contact with the outer circumferential surface of the anode and the side surface of the cathode. However, the configuration of the fuel cell is not limited thereto. In the latter case, for example, a sheet composed of a material through which the air passes and the fuel solution does not pass is provided on the surface of the cathode on the opposite side to the proton conductor.

The enzyme immobilized to the cathode and the anode may be various substances and is selected according to need. Furthermore, if an enzyme is immobilized to the cathode and the anode, preferably an electron mediator is immobilized in addition to the enzyme.

The enzyme immobilized to the cathode typically includes an oxygen reductase. As this oxygen reductase, e.g. bilirubin oxidase, laccase, ascorbic acid oxidase, or the like can be used. In this case, preferably, an electron mediator is also immobilized to the cathode in addition to the enzyme. As the electron mediator, e.g. potassium hexacyanoferrate, potassium ferricyanide, potassium octacyanotungstate, or the like is used. The electron mediator is immobilized preferably at sufficiently-high concentration, e.g. at $0.64 \times 10^{-6}$ mol/mm$^2$ or higher on average.

For example, if a monosaccharide such as glucose is used as the fuel, the enzyme immobilized to the anode includes an oxidase that promotes oxidation of the monosaccharide to break down the monosaccharide, and generally includes, in addition thereto, a coenzyme oxidase that returns a coenzyme reduced by the oxidase to the oxidized form. Due to the action of this coenzyme oxidase, an electron is produced when the coenzyme is returned to the oxidized form, and the electron is passed from the coenzyme oxidase to the electrode via the electron mediator. As the oxidase, e.g. NAD$^+$-dependent glucose dehydrogenase (GDH) is used. As the coenzyme, e.g. nicotinamide adenine dinucleotide (NAD$^+$) is used. As the coenzyme oxidase, e.g. diaphorase is used.

If a polysaccharide (polysaccharide in a broad sense, referring to all carbohydrates that yield two molecules or more of a monosaccharide by hydrolysis and encompassing oligosaccharides such as disaccharides, trisaccharides, and tetrasaccharides) is used as the fuel, preferably a degrading enzyme that promotes breakdown such as hydrolysis of the polysaccharide and produces a monosaccharide such as glucose is also immobilized in addition to the above-described oxidase, coenzyme oxidase, coenzyme, and electron mediator. As the polysaccharide, specifically e.g. starch, amylose, amylopectin, glycogen, cellulose, maltose, sucrose, lactose, and so on are cited. They are substances arising from coupling of two or more monosaccharides, and glucose is contained as the monosaccharide of the coupling unit in all of the polysaccharides. Note that the amylose and the amylopectin are components contained in the starch and the starch is a mixture of the amylose and the amylopectin. If glucoamylase is used as the degrading enzyme for the polysaccharide and the glucose dehydrogenase is used as the oxidase that breaks down the monosaccharide, electricity generation by use of a substance as the fuel is possible as long as the substance is a polysaccharide that can be broken down to glucose by the glucoamylase, such as a substance containing any of starch, amylose, amylopectin, glycogen, and maltose. Note that the glucoamylase is a degrading enzyme that hydrolyzes α-glucan such as starch to produce glucose and the glucose dehydrogenase is an oxidase that oxidizes β-D-glucose to D-glucono-δ-lactone. Preferably, a configuration is employed in which the degrading enzyme that breaks down the polysaccharide is also immobilized on the anode, and a configuration is employed in which the polysaccharide to become the fuel finally is also immobilized on the anode.

Furthermore, if starch is used as the fuel, it is also possible to use a substance obtained by gelatinizing the starch into a solidified fuel in the form of a gel. In this case, preferably, it is possible to employ a method in which the gelatinized starch is brought into contact with the anode to which the enzyme and so on is immobilized or is immobilized on the anode together with the enzyme and so on. If such an electrode is used, the concentration of the starch on the anode surface can be kept at a higher state compared with the case of using starch dissolved in a solution, so that the breakdown reaction by the enzyme becomes faster and the power output is enhanced. In addition, the handling of the fuel is easier than that in the case of the solution, and the fuel supply system can be simplified. Moreover, the need to give the fuel cell a notice "This Side Up" is eliminated. Consequently, it is very advantageous when being used in mobile apparatus for example.

Any substance may be used as the electron mediator basically. However, preferably, a compound having a quinone skeleton, especially a compound having a naphthoquinone skeleton, is used. Various kinds of naphthoquinone derivatives can be used as this compound having a naphthoquinone skeleton. Specifically, e.g. 2-amino-1,4-naphthoquinone (ANQ), 2-amino-3-methyl-1,4-naphthoquinone (AMNQ), 2-methyl-1,4-naphthoquinone (VK3), 2-amino-3-carboxy-1,4-naphthoquinone (ACNQ), or the like is used. As the compound having a quinone skeleton, besides the compound having a naphthoquinone skeleton, e.g. anthraquinone or a derivative thereof can also be used. In the electron mediator, besides the compound having a quinone skeleton, one kind or two kinds or more of other compounds serving as the electron mediator may be contained according to need. As the solvent used when the compound having a quinone skeleton, particularly the compound having a naphthoquinone skeleton, is immobilized to the anode, preferably acetone is used. By thus using acetone as the solvent, the solubility of the compound having a quinone skeleton can be enhanced, and the compound having a quinone skeleton can be efficiently immobilized to the anode. In the solvent, one kind or two kinds or more of solvents other than acetone may be contained according to need.

In one example, 2-methyl-1,4-naphthoquinone (VK3) as the electron mediator, reduced nicotinamide adenine dinucleotide (NADH) as the coenzyme, glucose dehydrogenase as the oxidase, and diaphorase as the coenzyme oxidase are immobilized to the anode. Preferably, they are immobilized at a ratio of 1.0 (mol): 0.33 to 1.0 (mol):(1.8 to 3.6)×10$^6$ (U):(0.85 to 1.7)×10$^7$ (U). Note that the U (unit) is one index indicating the enzyme activity and refers to the degree of the reaction of 1 µmol of the substrate per one minute at certain temperature and pH.

Various kinds of substances can be used as the immobilizing material for immobilizing the enzyme, the coenzyme, the electron mediator, and so on to the anode and the cathode. Preferably, a polyion complex can be used that is formed by using a polycation typified by poly-L-lysine (PLL) or a salt thereof and a polyanion typified by polyacrylic acid (e.g. sodium polyacrylate (PAAcNa)) or a salt thereof. The enzyme, the coenzyme, the electron mediator, and so on can be made to be contained inside this polyion complex.

By the way, if the electron mediator is immobilized to the cathode and the anode of this fuel cell, it is not necessarily easy to completely suppress elution and maintain the state in which the electron mediator is immobilized to the cathode and the anode for a long time because the electron mediator is a low-molecular substance in general. Thus, a phenomenon possibly occurs in which the electron mediator used for the cathode moves toward the anode side and adversely the electron mediator used for the anode moves toward the cathode side. In this case, there is a possibility that the lowering of the power output of the fuel cell and the lowering of the electrical capacitance are caused. To solve this problem, it is effective to use, as the electrolyte, a substance having a charge of the same sign as that of the charge of the oxidized form or reduced form of the electron mediator. By doing so, repulsive force works between the charge of the electrolyte and the charge of the oxidized form or reduced form of the electron mediator. Thus, it becomes hard for the electron mediator to move toward the electrolyte side, which can effectively suppress the passage of the electron mediator through the electrolyte and the movement thereof to the opposite side. Typically, in the electrolyte, a polymer having a charge of the same sign as that of the charge of the oxidized form or reduced form of the electron mediator, e.g. a polyanion or a polycation, is contained. Thereby, the electrolyte has the charge of the same sign as that of the charge of the oxidized form or reduced form of the electron mediator. However, the electrolyte is not limited thereto, but the electrolyte may be allowed to have the charge of the same sign as that of the charge of the oxidized form or reduced form of the electron mediator by another method. Specifically, if the oxidized form or reduced form of the electron mediator used for at least one of the cathode and the anode has a negative charge, a polymer having a negative charge, e.g. a polyanion, is made to be contained in the electrolyte. If the oxidized form or reduced form of the electron mediator has a positive charge, a polymer having a positive charge, e.g. a polycation, is made to be contained in the electrolyte. As the polyanion, for example, besides Nafion (commercial product name, by U.S. DuPont), which is an ion-exchange resin having a fluorine-containing carbon sulfonic acid group, dichromate ions ($Cr_2O_7^{2-}$), paramolybdate ions ($[Mo_7O_{24}]^{6-}$), polyacrylic acid (e.g. sodium polyacrylate (PAAcNa)), or the like can be used. As the polycation, e.g. poly-L-lysine (PLL) or the like can be used.

Various substances can be used as the proton conductor and are selected according to need. Specifically, for example, the following substances are cited: cellophane, a nonwoven fabric, a resin membrane based on perfluorocarbon sulfonic acid (PFS), a copolymeric membrane of a trifluorostyrene derivative, a polybenzimidazole membrane impregnated with a phosphoric acid, an aromatic polyether ketone sulfonic acid membrane, and a component composed of PSSA-PVA (polystyrene sulfonic acid polyvinyl alcohol copolymer), PSSA-EVOH (polystyrene sulfonic acid ethylene vinyl alcohol copolymer), an ion-exchange resin having a fluorine-containing carbon sulfonic acid group (Nafion (commercial product name, by U.S. DuPont)), or the like.

If an electrolyte containing a buffer substance (buffer solution) is used as the proton conductor, in order that, at the time of high-power operation, even when increase/decrease in the proton occurs inside the electrode or in the membrane to which the enzyme is immobilized due to the enzyme reaction via the proton, sufficient buffering capacity can be obtained and the deviation of the pH from the optimum pH can be suppressed to a sufficiently small value, and the intrinsic capability of the enzyme can be sufficiently exerted, it is effective that the concentration of the buffer substance contained in the electrolyte is set equal to or higher than 0.2 M and equal to or lower than 2.5 M. Preferably, the concentration is set equal to or higher than 0.2 M and equal to or lower than 2 M, more preferably equal to or higher than 0.4 M and equal to or lower than 2 M, and further preferably equal to or higher than 0.8 M and equal to or lower than 1.2 M. Any substance may be used as the buffer substance as long as it is one whose $pK_a$ is equal to or higher than 5 and equal to or lower than 9 in general. To cite specific examples, the following substances may be used: dihydrogen phosphate ions ($H_2PO_4^-$), 2-amino-2-hydroxymethyl-1,3-propanediol (abbreviated name, tris), 2-(N-morpholino)ethanesulfonic acid (MES), cacodylic acid, carbonic acid ($H_2CO_3$), hydrogen citrate ions, N-(2-acetamide)iminodiacetic acid (ADA), piperazine-N,N'-bis(2-ethanesulphonic acid) (PIPES), N-(2-acetamide)-2-aminoethanesulfonic acid (ACES), 3-(N-morpholino)propanesulfonic acid (MOPS), N-2-hydroxyethylpiperazine-N'-2-ethanesulfonic acid (HEPES), N-2-hydroxyethylpiperazine-N'-3-propanesulfonic acid (HEPPS), N-[tris(hydroxymethyl)methyl]glycine (abbreviated name, tricine), glycylglycine, N,N-bis(2-hydroxyethyl)glycine (abbreviated name, bicine), and so on. A substance that produces the dihydrogen phosphate ion ($H_2PO_4^-$) is e.g. sodium dihydrogen phosphate ($NaH_2PO_4$), potassium dihydrogen phosphate ($KH_2PO_4$), and so on. As the buffer substance, a compound containing an imidazole ring is also preferable. This compound containing an imidazole ring is, specifically, imidazole, triazole, a pyridine derivative, a bipyridine derivative, an imidazole derivative (histidine, 1-methylimidazole, 2-methylimidazole, 4-methylimidazole, 2-ethylimidazole, ethyl imidazole-2-carboxylate, imidazole-2-carboxyaldehyde, imidazole-4-carboxylic acid, imidazole-4,5-dicarboxylic acid, imidazole-1-yl-acetic acid, 2-acetylbenzimidazole, 1-acetylimidazole, N-acetylimidazole, 2-aminobenzimidazole, N-(3-aminopropyl)imidazole, 5-amino-2-(trifluoromethyl)benzimidazole, 4-azabenzimidazole, 4-aza-2-mercaptobenzimidazole, benzimidazole, 1-benzylimidazole, 1-butylimidazole), and so on. As the buffer substance, 2-aminoethanol, triethanolamine, TES (N-Tris(hydroxymethyl)methyl-2-aminoethanesulfonic acid), BES (N,N-Bis(2-hydroxyethyl)-2-aminoethenesulfonicacid), and so on may be used. The pH of the electrolyte containing the buffer substance is preferably around 7 but may be any of 1 to 14 in general. These buffer substances may also be immobilized to the membrane to which the above-described enzyme and electron mediator are immobilized according to need.

The entire configuration of this fuel cell is selected according to need. For example, if a configuration of a coin type or a button type is employed, preferably a structure is employed in which the cathode, the electrolyte, and the anode are housed inside the space formed between a cathode current collector having a structure through which an oxidant can pass and an anode current collector having a structure through which the fuel can pass. In this case, typically, the fringe of one of the cathode current collector and the anode current collector is swaged to the other of the cathode current collector and the anode current collector with the intermediary of an insulating hermetically-sealing member, and thereby the space for housing the cathode, the electrolyte, and the anode is formed. However, the structure is not limited thereto but this space may be formed by another processing method according to need. The cathode current collector and the anode current collector are electrically insulated from each other by the insulating hermetically-sealing member. As this insulating hermetically-sealing member, typically, a gasket composed of various kinds of elastic bodies such as silicone rubber is used. However, it is not limited thereto. The planar shape of these cathode current collector and anode current collector can be selected according to need, and is e.g. a circular shape, an elliptical shape, a rectangular shape, a hexagonal shape, or the like. Typically, the cathode current collector has one or plural oxidant supply ports, and the anode current collector has one or plural fuel supply ports. However, they are not necessarily limited thereto. For example, the formation of the oxidant supply port may be omitted by using a substance through which the oxidant can pass as the material of the cathode current collector, and the formation of the fuel supply port may be omitted by using a substance through which the fuel can pass as the material of the anode current collector. Typically, the anode current collector has a fuel holder. This fuel holder may be provided monolithically with the anode current collector, or may be provided attachably/detachably to/from the anode current collector. Typically, the fuel holder has a lid for hermetic sealing. In this case, the fuel can be injected in the fuel holder by removing this lid. It is also possible to inject the fuel from the side surface of the fuel holder or the like without the use of the lid for hermetic sealing. If the fuel holder is provided attachably/detachably to/from the anode current collector, e.g. a fuel tank, a fuel cartridge, or the like that is filled with the fuel in advance may be attached as the fuel holder. These fuel tank and fuel cartridge may be a disposable type. However, a holder that can be filled with the fuel is preferable in view of effective use of the resources. Furthermore, the used fuel tank or fuel cartridge may be replaced by a fuel tank or a fuel cartridge filled with the fuel. Moreover, for example, the continuous use of the fuel cell is allowed by forming the fuel holder into the form of an airtight container having a supply port and a discharge port for the fuel and continuously supplying the fuel from the external into the airtight container via this supply port. Alternatively, without the provision of the fuel holder in the fuel cell, the fuel cell may be used in such a state as to be floated on the fuel put in an open fuel tank with the anode side down and the cathode side up.

This fuel cell may have a structure in which the cathode, the electrolyte, the anode, and a cathode current collector having a structure through which an oxidant can pass are sequentially provided around a predetermined center axis and an anode current collector having a structure through which the fuel can pass is so provided as to be electrically connected to the anode. In this fuel cell, the anode may be in the form of a cylinder whose sectional shape is a circle, an ellipse, a polygon, or the like, or may be in the form of a column whose sectional shape is a circle, an ellipse, a polygon, or the like. If the anode is in the form of a cylinder, for example, the anode current collector may be provided on the inner circumferential surface side of the anode, or may be provided between the anode and the electrolyte, or may be provided on at least one end surface of the anode. More alternatively, it may be provided at two places or more of them. Furthermore, the anode may be so configured as to be capable of holding the fuel. For example, the anode may be composed of a porous material so that this anode may be made to serve also as the fuel holder. Alternatively, a column fuel holder may be provided on a predetermined center axis. For example, if the anode current collector is provided on the inner circumferential surface side of the anode, this fuel holder may be the space itself surrounded by this anode current collector, or may be a container such as a fuel tank or a fuel cartridge provided in this space separately from the anode current collector, and this container may be attach-able/detachable one or fixed one. The fuel holder is in the form of a circular column, an elliptic column, a polygonal column such as a rectangle or a hexagon, or the like. However, it is not limited thereto. The electrolyte may be formed in a container in the form of a bag so that it may envelop the whole of the anode and the anode current collector. By doing so, if the fuel is put in the fuel holder to the full, this fuel can be brought into contact with the whole of the anode. Of this container, at least the part sandwiched between the cathode and the anode may be formed by the electrolyte, and the other part may be formed by a material different from this electrolyte. By making this container as an airtight container having a supply port and a discharge port for the fuel and continuously supplying the fuel from the external into the container via this supply port, the continuous use of the fuel cell is allowed. As the anode, preferably, in order to allow the fuel to be sufficiently accumulated inside, one having a high porosity is preferable, and e.g. one whose porosity is equal to or higher than 60% is preferable.

It is also possible to use a pellet electrode as the cathode and the anode. This pellet electrode can be formed in the following manner. A carbon-based material (particularly, a fine powder carbon material having high electrical conductivity and large surface area is preferable), specifically, e.g. a material given high electrical conductivity, such as KB (ketjen black), a functional carbon material such as carbon nanotube or fullerene, or the like is mixed with a binder such as polyvinylidene difluoride according to need, powders of the above-described enzyme (or an enzyme solution), powders of the coenzyme (or a coenzyme solution), powders of the electron mediator (or an electron mediator solution), powders of a polymer for immobilization (or a polymer solution), and so on by an agate mortar or the like. The obtained mixture is appropriately dried and the resulting material is press-processed into a predetermined shape. The thickness of this pellet electrode (electrode thickness) is also decided according to need, and, to cite an example, is about 50 μm. For example, in the case of manufacturing a coin-type fuel cell, the pellet electrode can be formed by press-processing the above-described material for forming the pellet electrode into a shape of a circle (to cite one example of the diameter, 15 mm, but the diameter is not limited thereto but is decided according to need) by a tablet manufacturing machine. In the case of forming this pellet electrode, to obtain the necessary electrode thickness, for example, the amount of carbon in the material for forming the pellet electrode, the press pressure, and so on are controlled. In the case of inserting the cathode or the anode into a cell can of a coin type, it is preferable to insert a metal mesh spacer between these cathode or anode and cell can to thereby ensure electrical contact between them for example.

As a manufacturing method of the pellet electrode, besides the above-described method, for example, a carbon-based material, a binder according to need, and a mixed solution (water-based or organic solvent mixed solution) of enzyme immobilizing components (enzyme, coenzyme, electron mediator, polymer, and so on) may be appropriately applied to a current collector or the like and dried. Subsequently, the whole may be press-processed and thereafter may be cut into a desired electrode size.

This fuel cell can be used for substantially all of the things requiring the electrical power, and the size thereof is also no object. For example, it can be used for electronic apparatus, moving vehicles (cars, bicycles, aircrafts, rockets, spaceships, and so on), power units, construction equipment, machine tools, electricity generating systems, cogeneration systems, and so on. The power output, the size, the shape, the kind of fuel, and so on are decided depending on the use application.

The electronic apparatus may be any basically and encompasses both of portable apparatus and stationary apparatus. To cite specific examples, the electronic apparatus is cellular phones, mobile apparatus, robots, personal computers, game apparatus, in-car apparatus, home electrical appliances, industrial products, and so on.

A fourth invention is an enzyme-immobilized electrode formed of an electrode to which an enzyme is immobilized. The enzyme-immobilized electrode is characterized in that at least part of the surface of the electrode is rendered water repellent.

A fifth invention is a manufacturing method of an enzyme-immobilized electrode formed of an electrode to which an enzyme is immobilized. The manufacturing method is characterized in that at least part of the surface of the electrode is rendered water repellent.

The enzyme-immobilized electrode according to the fourth and fifth inventions is suitable to be applied to a fuel cell in which the cathode is formed of an electrode to which an enzyme is immobilized and this electrode has pores inside. Typically, the surface of the electrode is rendered water repellent by forming a water-repellent agent containing a water-repellent material on the surface of this electrode after the enzyme is immobilized to the surface of the electrode. As already described, it is extremely difficult thus far to render the surface of this electrode water repellent while maintaining the activity of the enzyme immobilized to the surface of the electrode.

In the fourth and fifth inventions, as for the characteristics other than the above-described ones, the characteristics described in connection with the first and second inventions hold true unless they go against the property thereof.

A sixth invention is a water-repellent agent characterized by containing at least a water-repellent material and an organic solvent in which the solubility of an enzyme is equal to or lower than 10 mg/ml.

To cite one example of this water-repellent agent, the water-repellent material is carbon powders, and the organic solvent is methyl isobutyl ketone.

In the sixth invention, as for the characteristics other than the above-described ones, the characteristics described in connection with the first and second inventions hold true unless they go against the property thereof.

A seventh invention is a fuel cell having a structure in which a cathode and an anode are opposed with the intermediary of a proton conductor. An enzyme is immobilized to at least one of the cathode and the anode. The fuel cell is characterized in that a water-repellent material is contained in an immobilizing material for the enzyme.

An eighth invention is a manufacturing method of a fuel cell having a structure in which a cathode and an anode are opposed with the intermediary of a proton conductor. An enzyme is immobilized to at least one of the cathode and the anode. The manufacturing method is characterized in that the enzyme is immobilized by using an immobilizing material containing a water-repellent material.

A ninth invention is an enzyme immobilizing material characterized by containing at least a water-repellent material and an organic solvent in which the solubility of an enzyme is equal to or lower than 10 mg/ml.

In the seventh to ninth inventions, the characteristics described in connection with the first and second inventions hold true unless they go against the property thereof.

In the first and second inventions, a nonwoven fabric is cited as an example of the proton conductor. Using a nonwoven fabric as the proton conductor in this manner has not been proposed in the past but is novel. Thus, a tenth invention is a fuel cell having a structure in which a cathode and an anode are opposed with the intermediary of a proton conductor. An enzyme is immobilized to at least one of the cathode and the anode. The fuel cell is characterized in that the proton conductor is formed of a nonwoven fabric.

In the tenth invention, the characteristics described in connection with the first and second inventions hold true unless they go against the property thereof.

In this invention configured as described above, at least part of the surface of the electrode having pores inside is rendered water repellent. Accordingly, the amount of water contained in the cathode can be maintained in the optimum range, and an extremely-high catalytic current value can be obtained at the cathode.

Additional features and advantages of the present invention are described in, and will be apparent from, the following Detailed Description and the Figures.

BRIEF DESCRIPTION OF FIGURES

FIG. 3 is a schematic diagram showing one example of the entire configuration of the biofuel cell according to the first embodiment of this invention.

FIG. 4 is a schematic diagram showing another example of the entire configuration of the biofuel cell according to the first embodiment of this invention.

FIG. 5 is a schematic diagram showing a measurement system used in measurement of chronoamperometry performed for evaluation of the biofuel cell according to the first embodiment of this invention.

FIG. 17 is a schematic diagram for explaining the mechanism of why a large current can be steadily obtained when the buffer solution containing imidazole is used in the biofuel cell according to the first embodiment of this invention.

FIG. 18 is a schematic diagram for explaining the mechanism of why the current decreases when a $NaH_2PO_4$ buffer solution is used in the biofuel cell according to the first embodiment of this invention.

FIG. 19 is a schematic diagram showing the relationships between the buffer solution concentration and the current density in the case in which various buffer solutions are used in the biofuel cell according to the first embodiment of this invention.

FIG. 20 is a schematic diagram showing the relationships between the buffer solution concentration and the current density in the case in which various buffer solutions are used in the biofuel cell according to the first embodiment of this invention.

FIG. 23 is a schematic diagram showing the result of cyclic voltammetry performed for verifying the effect to prevent the passage of an electron mediator in a biofuel cell according to a second embodiment of this invention.

FIG. 27 is a top view, a sectional view, and a back view showing a biofuel cell according to a third embodiment of this invention.

FIG. 29 is a schematic diagram for explaining a manufacturing method of the biofuel cell according to the third embodiment of this invention.

FIG. 34 is a front view and a longitudinal sectional view showing a biofuel cell according to a fifth embodiment of this invention.

DETAILED DESCRIPTION

Embodiments of this invention will be described below with reference to the drawings.

Figure 1:
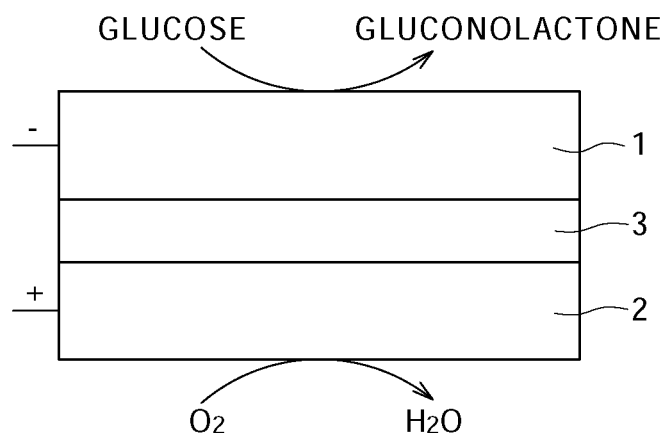
FIG. 1 is a schematic diagram showing a biofuel cell according to a first embodiment of this invention.
Figure 2:
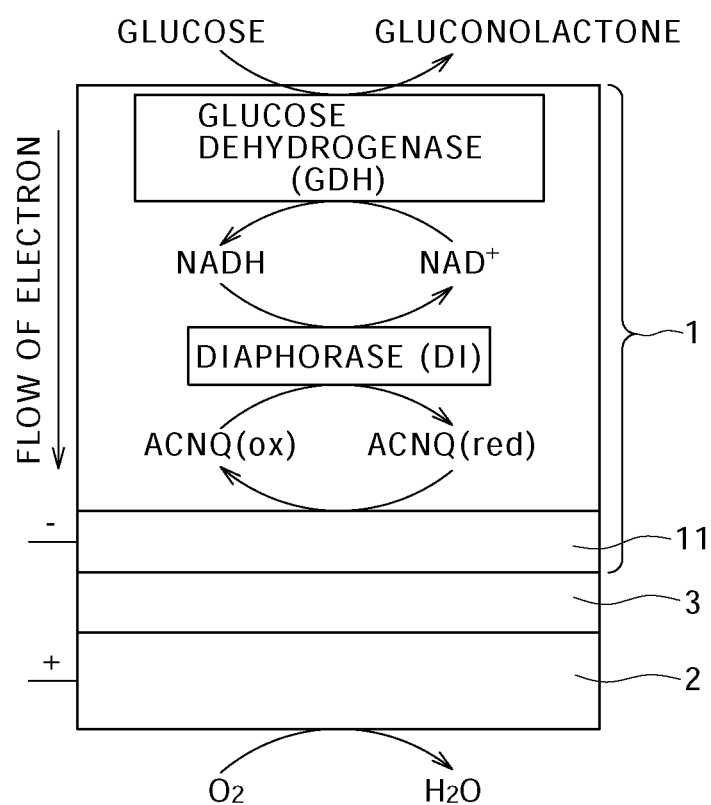
FIG. 2 is a schematic diagram schematically showing the details of the configuration of the anode of the biofuel cell according to the first embodiment of this invention, one example of the group of enzymes immobilized to this anode, and reaction of electron receiving/passing by this enzyme group.

FIG. 1 schematically shows a biofuel cell according to a first embodiment of this invention. Suppose that glucose is used as the fuel in this biofuel cell. FIG. 2 schematically shows the details of the configuration of the anode of this biofuel cell, one example of the group of enzymes immobilized to this anode, and reaction of electron receiving/passing by this enzyme group.

As shown in FIG. 1, this biofuel cell has a structure in which an anode 1 and a cathode 2 are opposed with the intermediary of an electrolyte layer 3 that conducts only the proton. The anode 1 breaks down the glucose supplied as the fuel by the enzymes to draw electrons and generate protons ($H^+$). The cathode 2 produces water by the proton transported from the anode 1 via the electrolyte layer 3, the electron sent from the anode 1 via an external circuit, and e.g. oxygen in the air.

The anode 1 is configured by immobilizing, on an electrode 11 (see FIG. 2) composed of e.g. porous carbon or the like, an enzyme involved in the breakdown of the glucose, a coenzyme (e.g. $NAD^+$, $NADP^+$, or the like) whose reduced form is produced in linkage with oxidation reaction in the breakdown process of the glucose, a coenzyme oxidase (e.g. diaphorase) that oxidizes the reduced form of the coenzyme (e.g. NADH, NADPH, or the like), and an electron mediator that receives the electron arising in linkage with the oxidation of the coenzyme from the coenzyme oxidase and passes the electron to the electrode 11 by an immobilizing material composed of e.g. a polymer or the like.

As the enzyme involved in the breakdown of the glucose, e.g. glucose dehydrogenase (GDH) can be used. By the existence of this oxidase, for example, β-D-glucose can be oxidized to D-glucono-δ-lactone.

Furthermore, this D-glucono-δ-lactone can be broken down to 2-keto-6-phospho-D-gluconate by the existence of two enzymes, gluconokinase and phosphogluconate dehydrogenase (PhGDH). Specifically, the D-glucono-δ-lactone becomes D-gluconate due to hydrolysis, and the D-gluconate is phosphorylated to become 6-phospho-D-gluconate by hydrolysis of adenosine triphosphate (ATP) into adenosine diphosphate (ADP) and the phosphoric acid under the existence of the gluconokinase. This 6-phospho-D-gluconate is oxidized to the 2-keto-6-phospho-D-gluconate by the action of the oxidase PhGDH.

Furthermore, besides the above-described breakdown process, the glucose can also be broken down to $CO_2$ by utilizing glucose metabolism. This breakdown process utilizing the glucose metabolism is roughly classified into the breakdown of the glucose and production of the pyruvic acid by the glycolytic system and the TCA cycle. They are widely-known reaction systems.

The oxidation reaction in the breakdown process of a monosaccharide is performed with the reduction reaction of the coenzyme. This coenzyme is virtually settled depending on the enzyme on which the coenzyme acts. In the case of the GDH, $NAD^+$ is used as the coenzyme. Specifically, when the β-D-glucose is oxidized to the D-glucono-δ-lactone by the action of the GDH, the $NAD^+$ is reduced to NADH, so that an $H^+$ is generated.

The produced NADH is immediately oxidized to the $NAD^+$ under the existence of the diaphorase (DI), so that two electrons and an $H^+$ are generated. Thus, two electrons and two $H^+$ are produced by one stage of oxidation reaction per one glucose molecule. By two stages of oxidation reaction, four electrons and four $H^+$ are produced in total.

The electrons produced in the above-described process are passed from the diaphorase to the electrode 11 via the electron mediator, and the $H^+$ are transported to the cathode 2 via the electrolyte layer 3.

The electron mediator carries out electron receiving/passing with the electrode 11, and the output voltage of the fuel cell depends on the redox potential of the electron mediator. Specifically, to obtain higher output voltage, it is more preferable to select an electron mediator of a more negative potential on the side of the anode 1. However, the reaction affinity of the electron mediator to the enzyme, the speed of electron exchange with the electrode 11, the structural stability against inhibitory factors (light, oxygen, and so on), and so forth must also be taken into consideration. From such a viewpoint, 2-amino-3-carboxy-1,4-naphthoquinone (ACNQ), vitamin K3, or the like is preferable as the electron mediator that acts on the anode 1. In addition, a compound having a quinone skeleton, a metal complex of osmium (Os), ruthenium (Ru), iron (Fe), cobalt (Co), or the like, a viologen compound such as benzyl viologen, a compound having a nicotinamide structure, a compound having a riboflavin structure, a compound having a nucleotide-phosphoric acid structure, and so on can also be used as the electron mediator.

The electrolyte layer 3 is a proton conductor that transports the $H^+$ generated in the anode 1 to the cathode 2, and is composed of a material that does not have the electron conductivity and can transport the $H^+$. As this electrolyte layer 3, e.g. a substance arbitrarily selected among the already-cited substances can be used. In this case, in this electrolyte layer 3, a solution that contains a compound having an imidazole ring as a buffer substance is contained as a buffer solution. This compound having an imidazole ring can be arbitrarily selected among the already-cited substances such as imidazole. Although the concentration of this compound having an imidazole ring as the buffer substance is selected according to need, preferably it is contained at a concentration that is equal to or higher than 0.2 M and equal to or lower than 3 M. This allows achievement of high buffering capacity, and the intrinsic capability of the enzyme can be sufficiently exerted even at the time of high-power operation of the fuel cell. Furthermore, the ionic strength (I. S.) adversely affects the activity of the enzyme both when it is too high and when it is too low. When the electrochemical responsiveness is also taken into consideration, it is preferable that the ionic strength be moderate ionic strength, e.g. about 0.3. However, the optimum values of the pH and the ionic strength exist for each of the enzymes used, and they are not limited to the above-described values.

It is preferable that the above-described enzyme, coenzyme, and electron mediator be immobilized on the electrode 11 by using an immobilizing material in order to efficiently capture the enzyme reaction phenomenon occurring near the electrode as an electrical signal. Furthermore, by immobilizing also the enzyme that breaks down the fuel and the coenzyme on the electrode 11, the enzyme reaction system of the anode 1 can be stabilized. As such an immobilizing material, e.g. one obtained by combining glutaraldehyde (GA) and poly-L-lysine (PLL) or one obtained by combining sodium polyacrylate (PAAcNa) and poly-L-lysine (PLL) may be used. Alternatively, they may be used alone. More alternatively, another polymer may be used. Using the immobilizing material obtained by combining the glutaraldehyde and the poly-L-lysine makes it possible to greatly improve the enzyme immobilizing capability possessed by each of them, and can obtain excellent enzyme immobilizing capability as a whole of the immobilizing material. In this case, the optimum value of the composition ratio of the glutaraldehyde and the poly-L-lysine differs depending on the enzyme to be immobilized and the substrate of this enzyme. However, it may be any composition ratio in general. To cite a specific example, a glutaraldehyde aqueous solution (0.125%) and a poly-L-lysine aqueous solution (1%) are used, and the ratio of them is set to 1:1, 1:2, 2:1, or the like.

In FIG. 2, as one example, the case is diagrammatically shown in which the enzyme involved in the breakdown of the glucose is glucose dehydrogenase (GDH), the coenzyme whose reduced form is produced in linkage with the oxidation reaction in the breakdown process of the glucose is $NAD^+$, the coenzyme oxidase that oxidizes NADH as the reduced form of the coenzyme is diaphorase (DI), and the electron mediator that receives the electron arising in linkage with the oxidation of the coenzyme from the coenzyme oxidase and passes the electron to the electrode 11 is ACNQ.

The cathode 2 is a component obtained by immobilizing, on an electrode composed of a material having pores inside, such as porous carbon, an oxygen reductase and an electron mediator that carries out electron receiving/passing with this electrode. As the oxygen reductase, e.g. bilirubin oxidase (BOD), laccase, ascorbic acid oxidase, or the like can be used. As the electron mediator, e.g. hexacyanoferrate ions produced by ionization of potassium hexacyanoferrate can be used. This electron mediator is immobilized preferably at sufficiently-high concentration, e.g. at $0.64 \times 10^{-6}$ mol/mm$^2$ or higher on average.

In this cathode 2, under the existence of the oxygen reductase, oxygen in the air is reduced by the H$^+$ from the electrolyte layer 3 and the electron from the anode 1 to produce water.

At the time of the operation (at the time of the use) of the fuel cell configured as described above, upon supply of glucose to the side of the anode 1, this glucose is broken down by a degrading enzyme including an oxidase. Due to the involvement of the oxidase in this breakdown process of the monosaccharide, electrons and H$^+$ can be produced on the side of the anode 1, and a current can be generated between the anode 1 and the cathode 2.

In this biofuel cell, at least part of the surface of the electrode having pores inside, used as the cathode 2, is rendered water repellent. Here, the term the surface of the electrode encompasses the whole of the outer surface of the electrode and the inner surfaces of the pores inside the electrode. Specifically, for example, the electrode is rendered water repellent by forming a water-repellent material on at least part of the surface of this electrode. To form this water-repellent material on the inner surfaces of the pores inside the electrode, it is necessary that this water-repellent material is rendered the form of microparticles (powders) sufficiently smaller than the size of this pore and occupation of most part of the space inside the pore by this water-repellent material is prevented. Although various substances can be used as this water-repellent material and are selected according to need, preferably e.g. carbon particles such as graphite powders are used. To form the water-repellent material on at least part of the surface of this electrode in this manner, for example, a water-repellent agent prepared by dispersing this water-repellent material in an organic solvent is applied on the surface of this electrode and this electrode is impregnated with the water-repellent agent via the pores inside the electrode. Thereafter, the organic solvent is removed. In the case of using such a water-repellent agent, it is important to prevent deactivation of the enzyme immobilized to the cathode 2. Furthermore, for this water-repellent electrode, it is preferable that the hydrophilicity of the immobilization substances such as the enzyme and the electron mediator to this electrode be high.

Two examples of the entire configuration of this biofuel cell are shown in FIG. 3 and FIG. 4.

The biofuel cell shown in FIG. 3 has a structure in which the anode 1 and the cathode 2 are opposed with the intermediary of the electrolyte layer 3. Furthermore, a sheet 13 composed of a material through which the air passes and a fuel solution 12 does not pass is applied on the surface of the cathode 2 on the opposite side to the electrolyte layer 3, and the biofuel cell is so configured that the fuel solution 12 (diagrammatical representation of the housing container of the fuel solution 12 is omitted) is in contact with the whole of the outer surface (upper surface and side surface) of the anode 1, the side surfaces of the anode 1 and the cathode 2, and the electrolyte layer 3 as part protruding to the outside of the cathode 2. For example a nonwoven fabric is used as the electrolyte layer 3. However, the electrolyte layer 3 is not limited thereto. Furthermore, e.g. a PTFE (polytetrafluoroethylene) membrane is used as the sheet 13. However, the sheet 13 is not limited thereto. In this biofuel cell, because the side surface of the cathode 2 is in contact with the fuel solution 12, water produced inside the cathode 2 along with the progression of the cell reaction is returned into the fuel solution 12 via the side surface of this cathode 2. Therefore, an advantage that the concentration of the fuel solution 12 can be kept nearly constant is achieved.

The biofuel cell shown in FIG. 4 has a structure in which the anode 1 and the cathode 2 are opposed with the intermediary of the electrolyte layer 3, and is so configured that the fuel solution 12 (diagrammatical representation of the housing container of the fuel solution 12 is omitted) is in contact with the whole of the outer surface (upper surface and side surface) of the anode 1 and the electrolyte layer 3 as part protruding to the outside of the anode 1 and the cathode 2. For example cellophane is used as the electrolyte layer 3. However, the electrolyte layer 3 is not limited thereto.

A description will be made below about the results of evaluation of the cathode 2 for the case in which the surface of the electrode is rendered water repellent and for the case in which the surface is not rendered water repellent.

As the cathode 2, an enzyme/electron mediator-immobilized electrode fabricated in the following manner was used. First, commercially-available carbon felt (BO050 made by TORAY) was prepared as porous carbon, and this carbon felt was cut out into 1-cm-square. Next, 80 μl of hexacyanoferrate ions (100 mM), 80 μl of poly-L-lysine (1 wt %), and 80 μl of a BOD solution (50 mg/ml) were in turn made to permeate the above-described carbon felt, and drying was performed. Next, this carbon felt was dipped into a water-repellent agent and the water-repellent agent was applied on the surface of this carbon felt. This water-repellent agent contained 13 to 18% of natural graphite as a water-repellent material, 3 to 8% of polyvinyl butyral as a binder, 8.4% of carbon black, and 69.48% of methyl isobutyl ketone as an organic solvent. Thereafter, drying was performed to remove the organic solvent contained in the water-repellent agent. In this manner, the graphite powders were formed as the water-repellent material on the surface of the carbon felt, and the carbon felt was rendered water repellent. The thickness of the enzyme/electron mediator-immobilized electrode thus obtained was 0.35 mm, and the area thereof was 1-cm-square. Two pieces or six pieces of this enzyme/electron mediator-immobilized electrode were stacked to be rendered the cathode 2. Separately from this, the cathode 2 that was the same as the above-described one except for that the surface of the carbon felt was not rendered water repellent was fabricated.

To investigate the influence of the above-described water-repellent agent on the enzyme immobilized to the cathode 2, i.e. the BOD, methyl isobutyl ketone, which was the organic solvent contained in this water-repellent agent, a BOD solution, and an ABTS solution were mixed. As a result, it was confirmed that phase separation into the methyl isobutyl ketone and water occurred. The BOD existed in the water phase and thus was proved to be hard to be deactivated.

Next, the water repellency of the component obtained by rendering the surface of the carbon felt water repellent in the above-described manner was checked. Specifically, the carbon felt whose surface was rendered water repellent by the water-repellent agent and the carbon felt whose surface was not rendered water repellent were prepared. Furthermore, the amounts of water contained in these pieces of carbon felt were measured by using a Karl-Fischer water content measuring instrument (VA-100 type made by Dia Instruments CO., LTD.) for the case in which these pieces of carbon felt had been left under a room temperature and for the case in which these pieces of carbon felt had been kept at a temperature of 25° C. under a humidity of 100% for six hours. The measurement results are shown below.

| Carbon Felt Without Water Repellency | |
|---|---|
| (1) left at room temperature | |
| first round | 632.5 |
| second round | 718.9 |
| third round | 645.1 |
| average | 665.5 |
| (2) left at a temperature of 25° C. under a humidity of 100% for six hours | |
| first round | 18482.2 |
| second round | 15434.4 |
| third round | 12549.1 |
| average | 15488.6 |

| Carbon Felt Rendered Water Repellent | |
|---|---|
| (1) left at room temperature | |
| first round | 1481.7 |
| second round | 756.6 |
| third round | 698.1 |
| fourth round | 1338.1 |
| average | 1068.6 |
| (2) left at a temperature of 25° C. under a humidity of 100% for six hours | |
| first round | 4943.8 |
| second round | 3516.8 |
| third round | 7280.8 |
| average | 5247.1 |

According to the above results, the amount of water contained in the carbon felt whose surface was rendered water repellent by the water-repellent agent was smaller, i.e. about one-third of the amount of water contained in the carbon felt whose surface was not rendered water repellent. Thus, it turned out that the carbon felt whose surface was rendered water repellent by the water-repellent agent certainly had water repellency.

Figure 6:
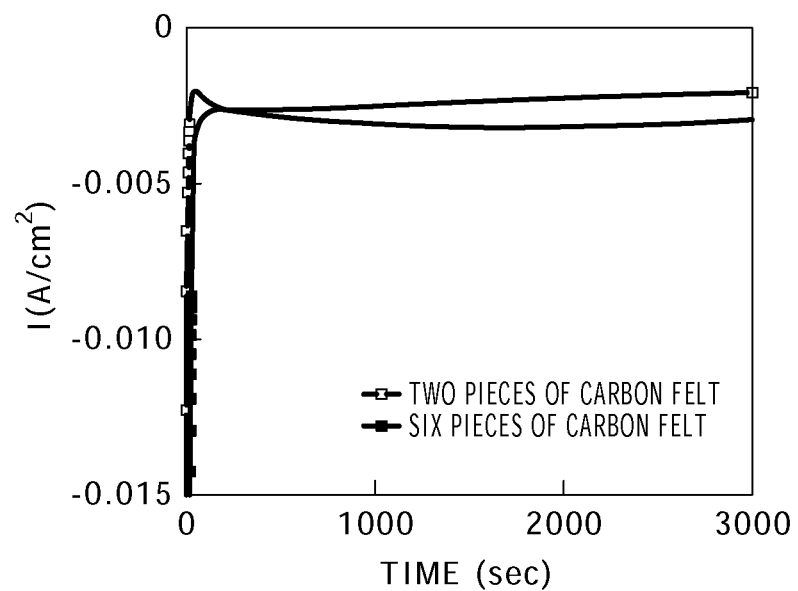
FIG. 6 is a schematic diagram showing the result of the chronoamperometry performed for the evaluation of the biofuel cell according to the first embodiment of this invention.
Figure 7:
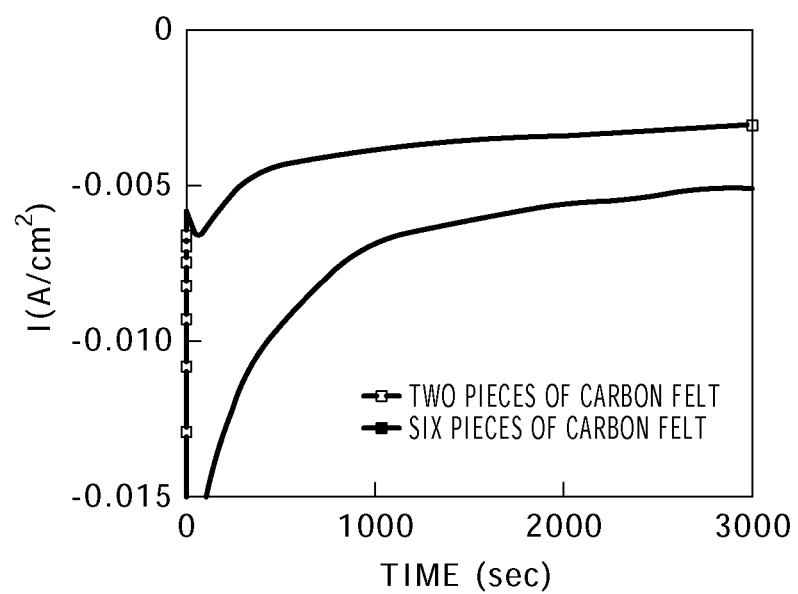
FIG. 7 is a schematic diagram showing the result of the chronoamperometry performed for the evaluation of the biofuel cell according to the first embodiment of this invention.

A description will be made below about the results of measurement of the electrochemical properties of the cathode 2 formed of the enzyme/electron mediator-immobilized electrode fabricated in the above-described manner. The measurement system used is shown in FIG. 5. As shown in FIG. 5, the measurement was performed in the state in which the cathode 2 was employed as the working electrode and placed on an air-permeable PTFE membrane 14 to be pressed and a buffer solution 15 was brought into contact with this cathode 2. A counter electrode 16 and a reference electrode 17 were immersed in the buffer solution 15, and electrochemical measuring equipment (not diagrammatically shown) was connected to the cathode 2 as the working electrode, the counter electrode 16, and the reference electrode 17. A Pt line was used as the counter electrode 16, and Ag|AgCl was used as the reference electrode 17. The measurement was performed under atmospheric pressure, and the measurement temperature was set to 25° C. As the buffer solution 15, an imidazole/hydrochloric acid buffer solution (pH 7, 2.0 M) was used. Chronoamperometry was performed for 3600 seconds by using the measurement system shown in FIG. 5. The result in the case in which the cathode 2 was the enzyme/electron mediator-immobilized electrode employing the carbon felt whose surface was not rendered water repellent is shown in FIG. 6. The result in the case in which the cathode 2 was the enzyme/electron mediator-immobilized electrode employing the carbon felt rendered water repellent by the water-repellent agent is shown in FIG. 7. From FIG. 6 and FIG. 7, it turns out that the cathode 2 formed of the enzyme/electron mediator-immobilized electrode employing the carbon felt rendered water repellent by the water-repellent agent was higher by about 50% in the current value after the elapse of 3600 seconds compared with the cathode 2 formed of the enzyme/electron mediator-immobilized electrode employing the carbon felt whose surface was not rendered water repellent. This proves the effectiveness of rendering the surface of the electrode of the cathode 2 water repellent.

Figure 8:
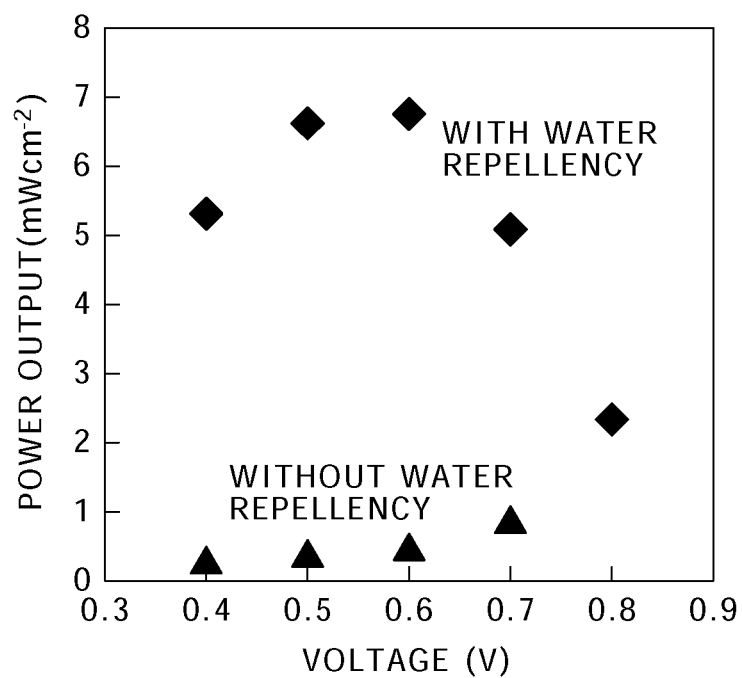
FIG. 8 is a schematic diagram showing the measurement result of the power output of the biofuel cell used for evaluation in the first embodiment of this invention.

The power output of the biofuel cell having the configuration shown in FIG. 3 was measured. As the cathode 2, the enzyme/electron mediator-immobilized electrode employing the carbon felt rendered water repellent by the water-repellent agent and the enzyme/electron mediator-immobilized electrode employing the carbon felt whose surface was not rendered water repellent were used. As the anode 1, an enzyme/coenzyme/electron mediator-immobilized electrode obtained by immobilizing, to a porous carbon electrode, GDI as an enzyme, DI as a coenzyme, and ANQ as an electron mediator was used. A nonwoven fabric was used as the electrolyte layer 3. A 0.4-M glucose solution was used as the fuel solution. The measurement result of the power output is shown in FIG. 8. From FIG. 8, it turns out that, if the enzyme/electron mediator-immobilized electrode employing the carbon felt rendered water repellent by the water-repellent agent was used as the cathode 2, a power output that was about ten times higher was obtained compared with the case in which the enzyme/electron mediator-immobilized electrode employing the carbon felt whose surface was not rendered water repellent was used as the cathode 2. This is considered a result reflecting the fact that the amount of water contained in the cathode 2 was maintained in the optimum range. As a result of measurement of change in the catalytic current value dependent on the amount of water contained in the cathode 2 by an experiment separately made, it has turned out that the catalytic current value rapidly changed across (the volume of the water contained in the electrode)/(the volume of the pores in the electrode)=70% and 70% or lower offered an extremely-large catalytic current value. Considering this, the amount of water contained in the cathode 2 is considered to be maintained at 70% or lower.

Figure 9:
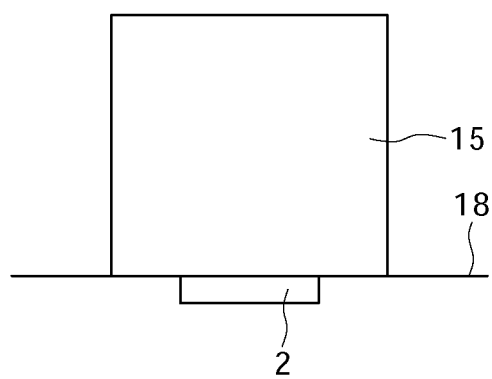
FIG. 9 is a schematic diagram showing a measurement system used in measurement of chronoamperometry performed for evaluation of the biofuel cell according to the first embodiment of this invention.
Figure 10:
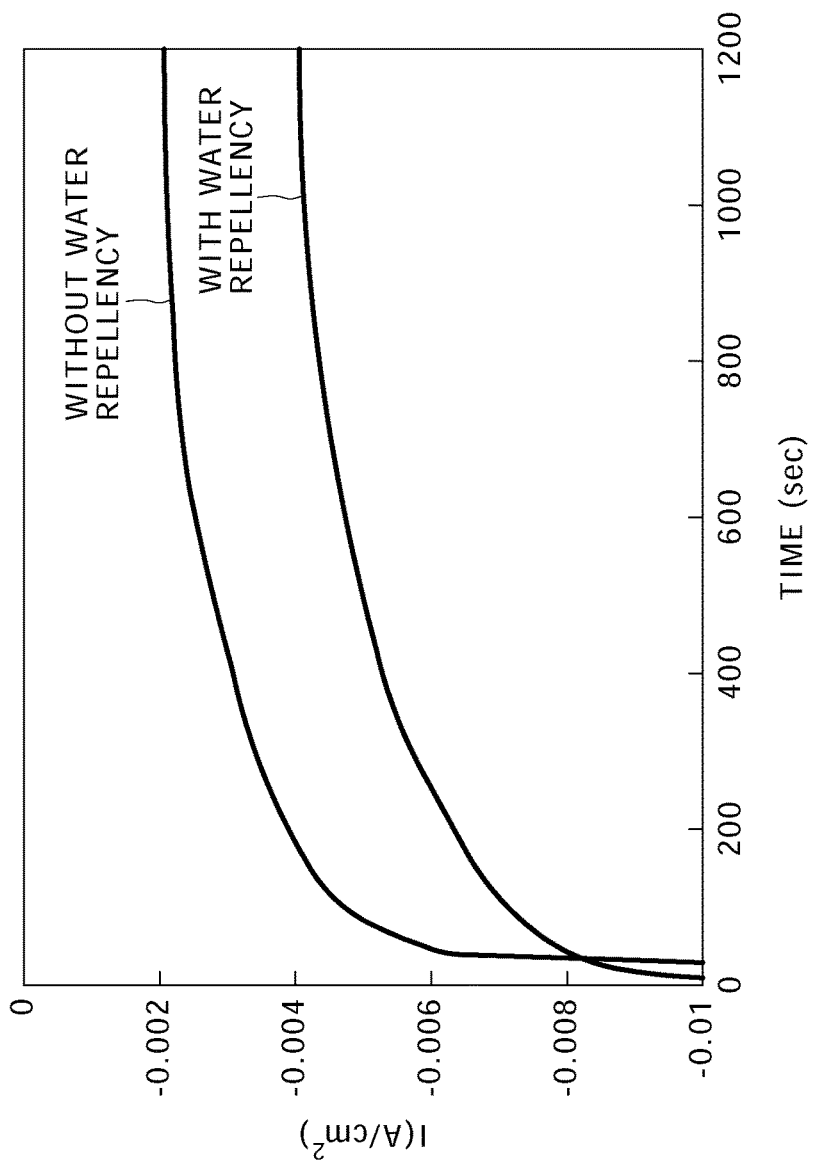
FIG. 10 is a schematic diagram showing the result of the chronoamperometry performed for the evaluation of the biofuel cell according to the first embodiment of this invention.

Next, a description will be made below about the results of measurement of the electrochemical properties of the cathode 2 formed of the enzyme/electron mediator-immobilized electrode fabricated in the above-described manner by use of a measurement system shown in FIG. 9. As shown in FIG. 9, in this measurement system, the measurement was performed in the state in which cellophane 18 in the form of a film was placed on the cathode 2 and the buffer solution 15 was brought into contact with this cellophane 18. Chronoamperometry was performed for 3600 seconds by using this measurement system. The results in the case in which the cathode 2 was the enzyme/electron mediator-immobilized electrode employing the carbon felt whose surface was not rendered water repellent and the case in which the cathode 2 was the enzyme/electron mediator-immobilized electrode employing the carbon felt rendered water repellent by the water-repellent agent are shown in FIG. 10. From FIG. 10, it turns out that, if the cathode 2 formed of the enzyme/electron mediator-immobilized electrode employing the carbon felt rendered water repellent by the water-repellent agent was used, the current value after the elapse of 1200 seconds was about twice higher compared with the case in which the cathode 2 formed of the enzyme/electron mediator-immobilized electrode employing the carbon felt whose surface was not rendered water repellent was used. Also in this case, the effectiveness of rendering the surface of the electrode of the cathode 2 water repellent is proved.

Figure 12:
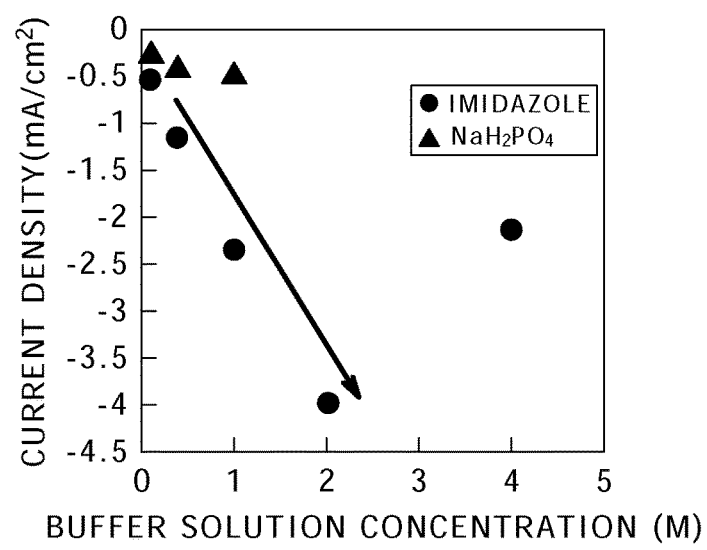
FIG. 12 is a schematic diagram showing the relationships between the buffer solution concentration and the obtained current density, obtained from the result of the chronoamperometry performed for explaining the effect of the use of the buffer solution containing imidazole in the biofuel cell according to the first embodiment of this invention.
Figure 13:
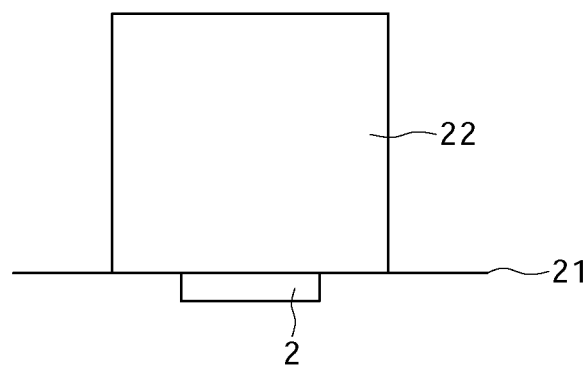
FIG. 13 is a schematic diagram showing a measurement system used in the measurement of the chronoamperometry performed for explaining the effect of the use of the buffer solution containing imidazole in the biofuel cell according to the first embodiment of this invention.

Next, a description will be made below about an effect of maintenance and enhancement of the current value in the case in which BOD is immobilized to the cathode 2 as an oxygen reductase and a solution obtained through mixing of imidazole and a hydrochloric acid and adjustment to pH 7 was used as the buffer solution. In Table 1 and FIG. 11, the results of chronoamperometry in which measurement was performed with variation in the concentration of the imidazole for this case are shown. Furthermore, the dependence of the current value (the value of the current density after 3600 seconds in Table 1 and FIG. 11) on the buffer solution concentration (the concentration of the buffer substance in the buffer solution) is shown in FIG. 12. In Table 1 and FIG. 12, for comparison, the result in the case in which a 1.0-M $NaH_2PO_4$/NaOH buffer solution (pH 7) was used as the buffer solution is also shown together. As shown in FIG. 13, this measurement was performed in the state in which the cellophane 18 in the form of a film was placed on the cathode 2 and a buffer solution 22 was brought into contact with this cellophane 18. As the cathode 2, an enzyme/electron mediator-immobilized electrode fabricated in the following manner was used. First, commercially-available carbon felt (BO050 made by TORAY) was used as porous carbon, and this carbon felt was cut out into 1-cm-square. Next, 80 µl of hexacyanoferrate ions (100 mM), 80 µl of poly-L-lysine (1 wt %), and 80 µl of a BOD solution (50 mg/ml) were in turn made to permeate the above-described carbon felt, and drying was performed. Thereby, the enzyme/electron mediator-immobilized electrode was obtained. Two pieces of the enzyme/electron mediator-immobilized electrode thus fabricated were stacked to be rendered the cathode 2.

TABLE 1

| | Current density (mA/cm²) | | | | | |
|---|---|---|---|---|---|---|
| | 1 sec | 180 sec | 300 sec | 600 sec | 1800 sec | 3600 sec |
| 1.0 M $NaH_2PO_4$ | −17.22 | −3.11 | −1.10 | −0.73 | −0.41 | −0.34 |
| 0.1 M imidazole | −5.64 | −3.98 | −3.71 | −2.98 | −0.70 | −0.54 |
| 0.4 M imidazole | −11.18 | −6.37 | −4.69 | −2.48 | −1.35 | −1.16 |
| 1.0 M imidazole | −15.59 | −8.44 | −5.81 | −3.86 | −2.60 | −2.32 |
| 2.0 M imidazole | −25.10 | −7.39 | −5.88 | −5.01 | −4.20 | −3.99 |
| 4.0 M imidazole | −5.08 | −3.90 | −4.19 | −4.53 | −3.47 | −2.13 |

Figure 11:
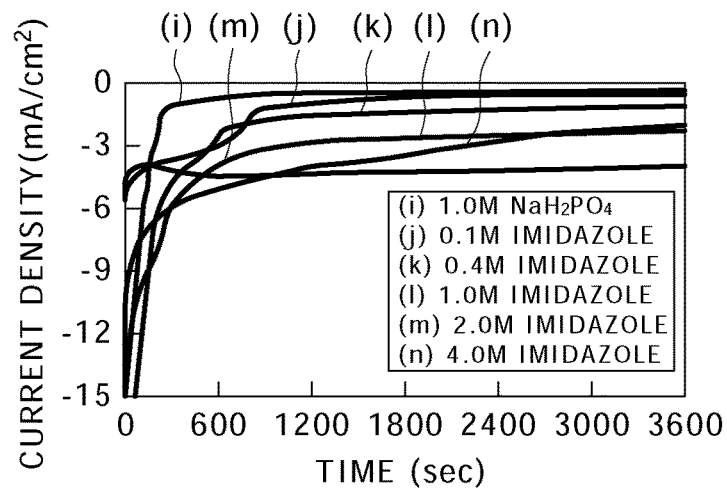
FIG. 11 is a schematic diagram showing the result of chronoamperometry performed for explaining the effect of use of a buffer solution containing imidazole in the biofuel cell according to the first embodiment of this invention.

As is understood from Table 1 and FIG. 11, when the $NaH_2PO_4$ concentration was 1.0 M, the current greatly decreased after 3600 seconds although the initial current was large. In contrast, particularly when the imidazole concentration was 0.4 M, 1.0 M, and 2.0 M, the lowering of the current was hardly found even after 3600 seconds. As is understood from FIG. 12, when the imidazole concentration was in the range of 0.2 to 2.5 M, the current value linearly increased with respect to the concentration. Furthermore, although both of the $NaH_2PO_4$/NaOH buffer solution and the imidazole/hydrochloric acid buffer solution had $pK_a$ around 7 and also had almost the same solubility of oxygen, a large oxygen reduction current was obtained if the imidazole existed in the buffer solution of the same concentration.

Figure 14:
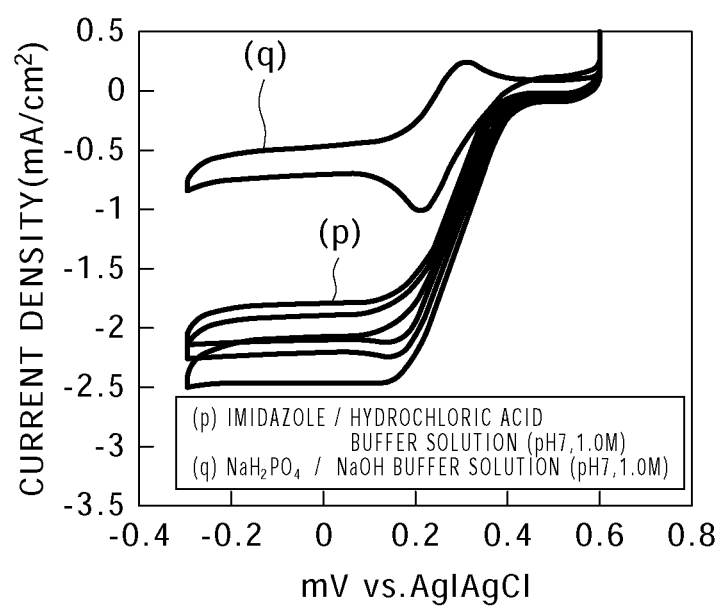
FIG. 14 is a schematic diagram showing the result of cyclic voltammetry performed for explaining the effect of the use of the buffer solution containing imidazole in the biofuel cell according to the first embodiment of this invention.
Figure 15:
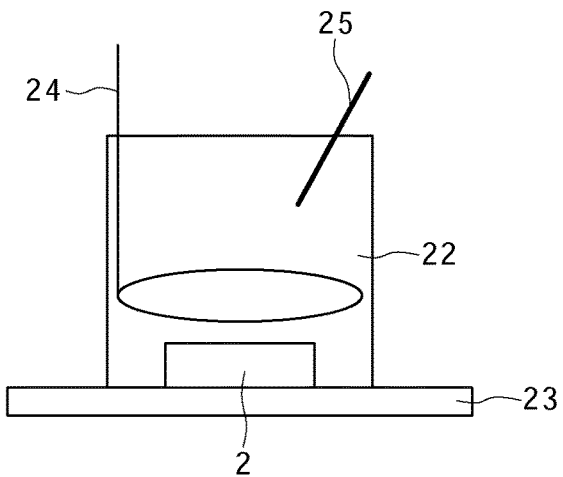
FIG. 15 is a schematic diagram showing a measurement system used in the measurement of the cyclic voltammetry shown in FIG. 14.

After the chronoamperometry was performed for 3600 seconds in the above-described manner, cyclic voltammetry (CV) between a potential of −0.3 and +0.6 V was performed. The result thereof is shown in FIG. 14. Note that this measurement was performed in the state in which, as shown in FIG. 15, the cathode 2 formed of an enzyme/electron mediator-immobilized electrode that is the same as the above-described one except for that it was not rendered water repellent was employed as the working electrode and placed on an air-permeable PTFE membrane 23 and the buffer solution 22 was brought into contact with this cathode 2. A counter electrode 24 and a reference electrode 25 were immersed in the buffer solution 22, and electrochemical measuring equipment (not diagrammatically shown) was connected to the cathode 2 as the working electrode, the counter electrode 24, and the reference electrode 25. A Pt line was used as the counter electrode 24, and Ag|AgCl was used as the reference electrode 25. The measurement was performed under atmospheric pressure, and the measurement temperature was set to 25° C. As the buffer solution 22, two kinds of solutions, an imidazole/hydrochloric acid buffer solution (pH 7, 1.0 M) and a $NaH_2PO_4$/NaOH buffer solution (pH 7, 1.0 M), were used.

From FIG. 14, it turns out that an extremely-favorable CV characteristic was obtained if the imidazole/hydrochloric acid buffer solution (pH 7, 1.0 M) was used as the buffer solution 22.

From the above-described fact, it was confirmed that the imidazole buffer solution had superiority even when the measurement system was changed.

Figure 16:
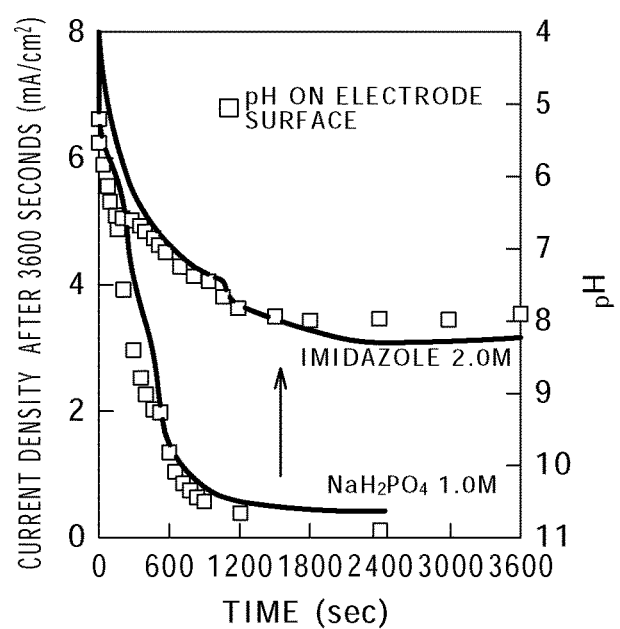
FIG. 16 is a schematic diagram showing the result of the chronoamperometry performed for explaining the effect of the use of the buffer solution containing imidazole in the biofuel cell according to the first embodiment of this invention.

FIG. 16 is a diagram showing the result of chronoamperometry that was performed similarly to the already-described method in such a way that BOD was immobilized to the cathode 2 and a 2.0-M imidazole/hydrochloric acid buffer solution and a 1.0-M $NaH_2PO_4$/NaOH buffer solution were used, together with the result of measurement of the pH on the electrode surface during the chronoamperometry. Note that the $pK_a$ of the imidazole/hydrochloric acid buffer solution was 6.95, the conductivity was 52.4 mS/cm, the solubility of oxygen was 0.25 mM, and the pH was 7. Furthermore, the $pK_a$ of the $NaH_2PO_4$/NaOH buffer solution was 6.82 ($H_2PO_4^-$), the conductivity was 51.2 mS/cm, the solubility of oxygen was 0.25 mM, and the pH was 7. As is understood from FIG. 16, if the 2.0-M imidazole/hydrochloric acid buffer solution was used, current density that was about fifteen times higher was obtained compared with the case in which the 1.0-M $NaH_2PO_4$/NaOH buffer solution was used. Furthermore, from FIG. 16, it turns out that the change in the current virtually coincided with the change in the pH on the electrode surface. The reason why these results were obtained will be described below with reference to FIG. 17 and FIG. 18.

FIG. 17 and FIG. 18 show the state in which BOD 32 is immobilized to an electrode 31 together with an electron mediator 34 by an immobilizing material 33 such as a polyion complex. As shown in FIG. 17, if the 2.0-M imidazole/hydrochloric acid buffer solution was used, high buffering capacity would be obtained due to supply of sufficiently many protons ($H^+$), and high current density would be steadily obtained due to the stability of the pH. On the other hand, as shown in FIG. 18, if the 1.0-M $NaH_2PO_4$/NaOH buffer solution was used, the buffering capacity would be insufficient because the amount of supply of $H^+$ was small, and therefore the current density would decrease due to large increase in the pH.

FIG. 19 and FIG. 20 show change in the current density after 3600 seconds (one hour) with respect to the buffer solution concentration in the case in which various buffer solutions were used. As is understood from FIG. 19 and FIG. 20, if the buffer solution containing a compound having the imidazole ring was used, generally high current density was obtained compared with the case in which another buffer solution such as the buffer solution containing $NaH_2PO_4$ was used. This trend became more noticeable when the buffer solution concentration became higher particularly. Furthermore, from FIG. 19 and FIG. 20, it also turns out that high current density was obtained also when the buffer solution containing 2-aminoethanol, triethanolamine, TES, or BES as the buffer substance was used and this trend became more noticeable when the buffer solution concentration became higher particularly.

Figure 21:
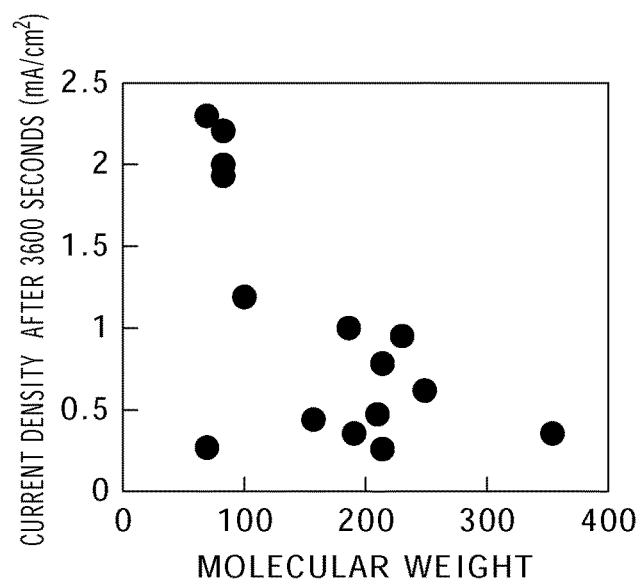
FIG. 21 is a schematic diagram showing the relationships between the molecular weight of the buffer substance in the buffer solution and the current density in the case in which various buffer solutions are used in the biofuel cell according to the first embodiment of this invention.
Figure 22:
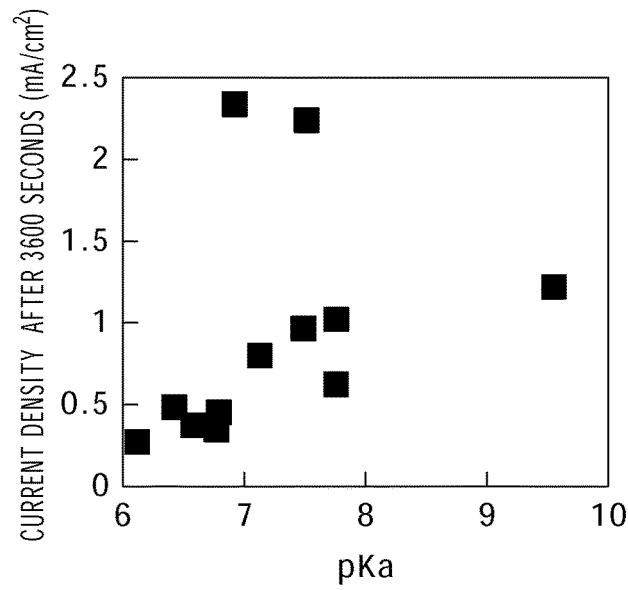
FIG. 22 is a schematic diagram showing the relationships between the $pK_a$ of the buffer solution and the current density in the case in which various buffer solutions are used in the biofuel cell according to the first embodiment of this invention.

In FIG. 21 and FIG. 22, diagrams made by plotting the current density after 3600 seconds in the case in which the buffer solution shown in FIG. 19 and FIG. 20 was used with respect to the molecular weight and $pK_a$ of the buffer substance.

As described above, according to this first embodiment, the surface of the electrode of the cathode 2 is rendered water repellent, and therefore the amount of water contained in the cathode 2 can be maintained in the optimum range. Thereby, a high catalytic current can be obtained, and hence a high current value can be continuously obtained in the biofuel cell. In addition, the electrolyte layer 3 contains a compound containing the imidazole ring as the buffer substance, and thereby sufficient buffering capacity can be obtained. Thus, at the time of the high-power operation of the biofuel cell, even when increase/decrease in the proton occurs inside the electrode of the proton or in the membrane to which the enzyme is immobilized due to the enzyme reaction via the proton, sufficient buffering capacity can be obtained, and the deviation of the pH of the electrolyte around the enzyme from the optimum pH can be suppressed to a sufficiently small value. Consequently, the intrinsic capability of the enzyme can be sufficiently exerted, and the electrode reaction by the enzyme, the coenzyme, the electron mediator, and so on can be performed efficiently and steadily. Thereby, a high-performance biofuel cell capable of high-power operation can be realized. This biofuel cell is suitable to be applied to the power supply of various kinds of electronic apparatus, moving vehicles, electricity generating systems, and so on.

Next, a biofuel cell according to a second embodiment of this invention will be described below.

In this biofuel cell, the electrolyte layer 3 has a charge of the same sign as that of the charge of the oxidized form or reduced form of the electron mediator used for the cathode 2 and the anode 1. For example, at least the surface of the electrolyte layer 3 on the side of the cathode 2 is negatively charged and has a negative charge. Specifically, for example, a polyanion having a negative charge is included in the whole or part of at least the part of this electrolyte layer 3 on the side of the cathode 2. Preferably, as this polyanion, Nafion (commercial product name, by U.S. DuPont), which is an ion-exchange resin having a fluorine-containing carbon sulfonic acid group, is used.

Here, a description will be made below about the results of comparative experiments made in order to verify that, if the electrolyte layer 3 has a charge of the same sign as that of the charge of the oxidized form or reduced form of the electron mediator, this oxidized form or reduced form of the electron mediator can prevent the passage of the electrolyte layer 3.

First, two commercially-available glassy carbon (GC) electrodes (diameter 3 mm) were prepared, and both were polished and cleaned. Next, 5 µl of an emulsion (20%) of the commercially-available Nafion, which was a polyanion, was added to one of the glassy carbon electrodes, and drying was performed. Next, these two glassy carbon electrodes were immersed in 1 mM of a hexacyanoferrate ion (polyvalent anion) aqueous solution (50-mM $NaH_2PO_4$/NaOH buffer solution, pH 7), and cyclic voltammetry (CV) was performed at a sweep rate of 20 $mVs^{-1}$. The result thereof is shown in FIG. 23(A). In FIG. 23(B), the CV curve in FIG. 23(A) in the case in which the glassy carbon electrode to which the Nafion was added was used is shown in an enlarged manner. As is understood from FIG. 23(A) and FIG. 23(B), with the glassy carbon electrode to which the Nafion was added, the redox peak current attributed to the hexacyanoferrate ion as the electron mediator became one-twentieth or lower compared with the glassy carbon electrode to which the Nafion was not added. This shows that the hexacyanoferrate ion, which was a polyvalent anion having a negative charge as with the Nafion, did not diffuse in and pass through the Nafion, which was a polyanion having a negative charge.

Figure 24:
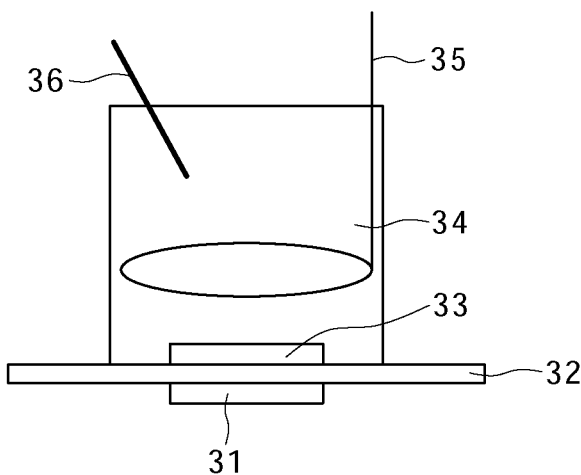
FIG. 24 is a schematic diagram showing a measurement system used in the cyclic voltammetry performed for verifying the effect to prevent the passage of the electron mediator in the biofuel cell according to the second embodiment of this invention.
Figure 25:
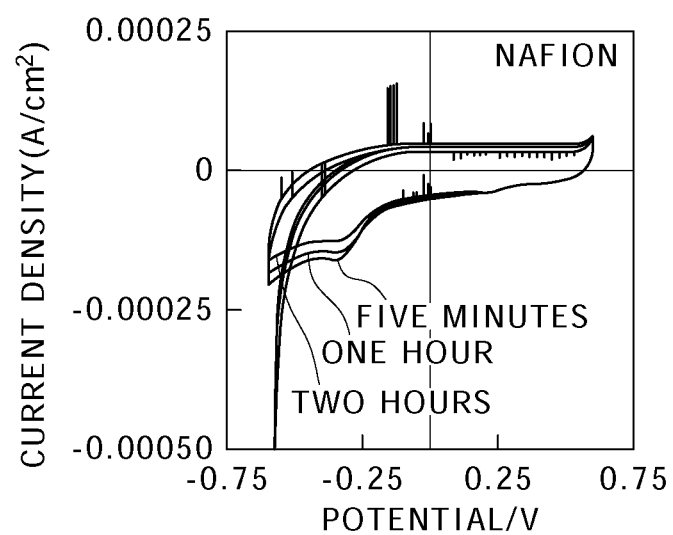
FIG. 25 is a schematic diagram showing the result of the cyclic voltammetry performed for verifying the effect to prevent the passage of the electron mediator in the biofuel cell according to the second embodiment of this invention.
Figure 26:
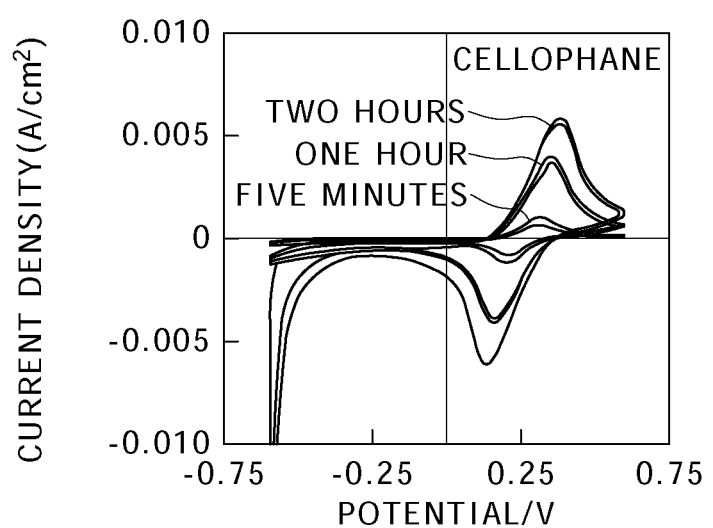
FIG. 26 is a schematic diagram showing the result of the cyclic voltammetry performed for verifying the effect to prevent the passage of the electron mediator in the biofuel cell according to the second embodiment of this invention.

Next, commercially-available carbon felt (B0050 made by TORAY) was used as porous carbon, and this carbon felt was cut out into 1-cm-square. 80 µl of hexacyanoferrate ions (1 M) were made to permeate the carbon felt, and drying was performed. Two pieces of the electrode thus fabricated were stacked to be rendered a test electrode. As shown in FIG. 24, a separator 32 (component corresponding to the electrolyte layer 3) in the form of a film was placed on this test electrode 31, and a working electrode 33 (immobilizing material 33) was so provided as to be opposed to the test electrode 31 with the intermediary of this separator 32. As this working electrode 33, a component made by cutting out commercially-available carbon felt (B0050 made by TORAY) into 1-cm-square was used. Then, a solution prepared by dissolving hexacyanoferrate ions as the electron mediator in a buffer solution 34 composed of 0.4-M $NaH_2PO_4$/NaOH (pH 7) (diagrammatical representation of the housing container of the buffer solution 34 is omitted) was brought into contact with the separator 32 and the working electrode 33. As the separator 32, cellophane having no charge and Nafion (pH 7), which was a polyanion having a negative charge, were used. Cyclic voltammetry was performed after five minutes, one hour, and two hours after the separator 32 had been brought into contact with the buffer solution 34 (electrolytic solution) in which the hexacyanoferrate ions were dissolved. Thereby, the redox peak value of the electron mediator that had passed through the separator 32 from the test electrode 31, i.e. the hexacyanoferrate ions, was compared. A counter electrode 35 and a reference electrode 36 were immersed in the buffer solution 34, and electrochemical measuring equipment (not diagrammatically shown) was connected to the working electrode 33, the counter electrode 35, and the reference electrode 36. A Pt line was used as the counter electrode 35, and Ag|AgCl was used as the reference electrode 36. The measurement was performed under atmospheric pressure, and the measurement temperature was set to 25° C. The measurement result in the case in which the Nafion was used as the separator 32 is shown in FIG. 25. Furthermore, the measurement result in the case in which the cellophane was used as the separator 32 is shown in FIG. 26. As is understood from FIG. 25 and FIG. 26, if the cellophane was used as the separator 32, the redox peak of the hexacyanoferrate ions was observed after as early as five minutes after the start of the measurement, and the redox peak value increased as time advanced. In contrast, if the Nafion was used as the separator 32, the redox peak of the hexacyanoferrate ions was not observed even after the elapse of two hours after the start of the measurement. From this, it was confirmed that the hexacyanoferrate ions passed through the separator 32 if the cellophane was used as the separator 32 whereas the hexacyanoferrate ions did not pass through the separator 32 if the Nafion was used as the separator 32.

According to this second embodiment, the following advantages can be achieved in addition to the same advantages as those by the first embodiment. Specifically, because the electrolyte layer 3 has a charge of the same sign as that of the charge of the oxidized form or reduced form of the electron mediator used for the cathode 2 and the anode 1, it is possible to effectively suppress the passage of the electron mediator for one of the cathode 2 and the anode 1 through the electrolyte layer 3 and the movement of the electron mediator to the other of the cathode 2 and the anode 1. Thus, the lowering of the power output of the biofuel cell and the lowering of the electrical capacitance thereof can be sufficiently suppressed.

Next, a biofuel cell according to a third embodiment of this invention will be described below.

Figure 28:
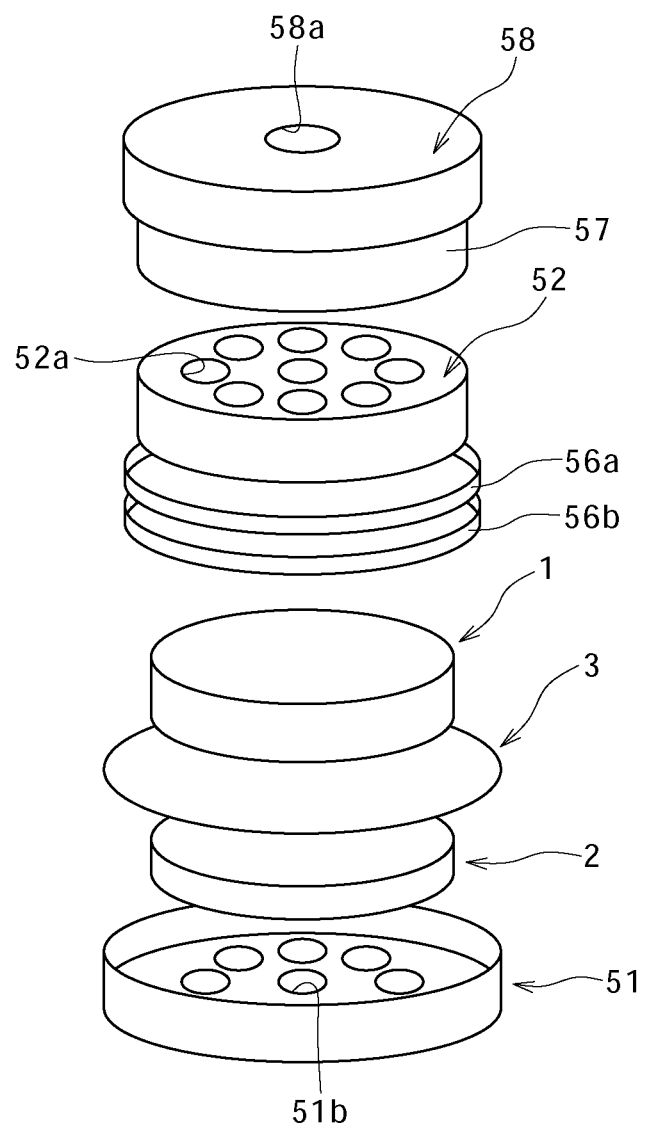
FIG. 28 is an exploded perspective view showing the biofuel cell according to the third embodiment of this invention.

FIG. 27(A), FIG. 27(B), FIG. 27(C), and FIG. 28 show this biofuel cell. FIG. 27(A), FIG. 27(B), and FIG. 27(C) are a top view, a sectional view, and a back view of this biofuel cell, and FIG. 28 is an exploded perspective view showing the respective constituent elements of this biofuel cell in an exploded manner.

As shown in FIG. 27(A), FIG. 27(B), FIG. 27(C), and FIG. 28, in this biofuel cell, inside the space formed between a cathode current collector 51 and an anode current collector 52, a cathode 2, an electrolyte layer 3, and an anode 1 are so housed that the tops and bottoms thereof are sandwiched by the cathode current collector 51 and the anode current collector 52. Components adjacent to each other among these cathode current collector 51, anode current collector 52, cathode 2, electrolyte layer 3, and anode 1 are in tight contact with each other. In this case, these cathode current collector 51, anode current collector 52, cathode 2, electrolyte layer 3, and anode 1 have a circular planar shape, and the whole of this biofuel cell also has a circular planar shape.

The cathode current collector 51 is a component for collecting the current generated at the cathode 2, and the current is drawn from this cathode current collector 51 to the external. Furthermore, the anode current collector 52 is a component for collecting the current generated at the anode 1. In general, these cathode current collector 51 and anode current collector 52 are formed of a metal, an alloy, or the like. However, they are not limited thereto. The cathode current collector 51 has a flat, nearly-cylindrical shape. The anode current collector 52 also has a flat, nearly-cylindrical shape. Furthermore, the fringe of an outer circumferential part 51a of the cathode current collector 51 is swaged to an outer circumferential part 52a of the anode current collector 52 with the intermediary of a ring gasket 56a composed of an insulating material such as silicone rubber and a ring hydrophobic resin 56b of e.g. polytetrafluoroethylene (PTFE) or the like. Thereby, the space for housing the cathode 2, the electrolyte layer 3, and the anode 1 is formed. The hydrophobic resin 56b is provided in the space surrounded by the cathode 2, the cathode current collector 51, and the gasket 56a in such a state as to be in tight contact with these cathode 2, cathode current collector 51, and gasket 56a. By this hydrophobic resin 56b, the excess permeation of the fuel into the side of the cathode 2 can be effectively suppressed. The end part of the electrolyte layer 3 is extended to the outside of the cathode 2 and the anode 1, and is sandwiched between the gasket 56a and the hydrophobic resin 56b. The cathode current collector 51 has plural oxidant supply ports 51b in the entire surface of its bottom face, and the cathode 2 is exposed inside these oxidant supply ports 51b. Although 13 circular oxidant supply ports 51b are diagrammatically shown in FIG. 27(C) and FIG. 28, this is merely one example and the number, shape, size, and arrangement of the oxidant supply ports 51b can be all arbitrarily selected. The anode current collector 52 also has plural fuel supply ports 52b in the entire surface of its top face, and the anode 1 is exposed inside these fuel supply ports 52b. Although seven circular fuel supply ports 52b are diagrammatically shown in FIG. 28, this is merely one example and the number, shape, size, and arrangement of the fuel supply ports 52b can be all arbitrarily selected.

The anode current collector 52 has a fuel tank 57 having a cylindrical shape on its surface on the opposite side to the anode 1. This fuel tank 57 is formed monolithically with the anode current collector 52. In this fuel tank 57, the fuel (not diagrammatically shown) to be used, e.g. a glucose solution, a solution made by further adding an electrolyte thereto, or the like, is put. A lid 58 having a cylindrical shape is removably attached to this fuel tank 57. This lid 58 is fitted in or screwed to the fuel tank 57 for example. A circular fuel supply port 58a is formed at the center part of this lid 58. This fuel supply port 58a is hermetically sealed by e.g. applying of a hermetic seal, whose diagrammatical representation is omitted, or the like.

The configuration of this biofuel cell other than the above-described ones is the same as that of the first embodiment unless it goes against the property thereof.

Next, one example of a manufacturing method of this biofuel cell will be described below. This manufacturing method is shown in FIG. 29(A) to FIG. 29(D).

As shown in FIG. 29(A), first, the cathode current collector 51 having a cylindrical shape whose one end is opened is prepared. The plural oxidant supply ports 51b are formed in the entire surface of the bottom face of this cathode current collector 51. The ring hydrophobic resin 56b is placed on the outer circumferential part of the bottom face inside this cathode current collector 51, and the cathode 2, the electrolyte layer 3, and the anode 1 are sequentially stacked over the center part of this bottom face.

On the other hand, as shown in FIG. 29(B), a component obtained by forming the fuel tank 57 having a cylindrical shape monolithically on the anode current collector 52 having a cylindrical shape whose one end is opened is prepared. The plural fuel supply ports 52b are formed in the entire surface of this anode current collector 52. The gasket 56a having a U-character sectional shape is attached to the fringe of the outer circumferential part of this anode current collector 52. Subsequently, this anode current collector 52 is put on the anode 1 with its opened-part side down, and the cathode 2, the electrolyte layer 3, and the anode 1 are sandwiched between the cathode current collector 51 and the anode current collector 52.

Next, as shown in FIG. 29(C), the component obtained by thus sandwiching the cathode 2, the electrolyte layer 3, and the anode 1 between the cathode current collector 51 and the anode current collector 52 is placed on a platform 61 of swaging apparatus. The anode current collector 52 is pressed by a pressing member 62 and close neighbors of the cathode current collector 51, the cathode 2, the electrolyte layer 3, the anode 1, and the anode current collector 52 are brought into tight contact with each other. In this state, a swaging tool 63 is dropped down to swage the fringe of the outer circumferential part 51a of the cathode current collector 51 to the outer circumferential part 52a of the anode current collector 52 with the intermediary of the gasket 56a and the hydrophobic resin 56b. In this swaging, the gasket 56a is gradually crushed so that a gap formation between the cathode current collector 51 and the gasket 56a and between the anode current collector 52 and the gasket 56a may be prevented. Furthermore, on this occasion, the hydrophobic resin 56b is also gradually compressed so that it may be brought into tight contact with the cathode 2, the cathode current collector 51, and the gasket 56a. By doing so, in the state in which the cathode current collector 51 and the anode current collector 52 are electrically insulated from each other by the gasket 56a, the space for housing the cathode 2, the electrolyte layer 3, and the anode 1 is formed inside them. Thereafter, the swaging tool 63 is raised up.

In this manner, as shown in FIG. 29(D), the biofuel cell is manufactured in which the cathode 2, the electrolyte layer 3, and the anode 1 are housed inside the space formed between the cathode current collector 51 and the anode current collector 52.

Next, the lid 58 is attached to the fuel tank 57, and the fuel and the electrolyte are injected through the fuel supply port 58a of this lid 58. Thereafter, this fuel supply port 58a is closed by applying of a hermetic seal or the like. However, the fuel and the electrolyte may be injected in the fuel tank 57 in the step shown in FIG. 29(B).

In this biofuel cell, if e.g. a glucose solution is used as the fuel put in the fuel tank 57, the anode 1 breaks down the supplied glucose by the enzyme to draw electrons and generate $H^+$. The cathode 2 produces water by $H^+$ each transported from the anode 1 via the electrolyte layer 3, the electron sent from the anode 1 via the external circuit, and e.g. oxygen in the air. Furthermore, output voltage is obtained between the cathode current collector 51 and the anode current collector 52.

Figure 30:
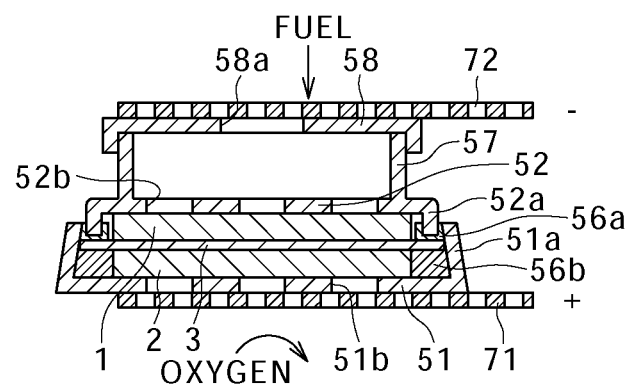
FIG. 30 is a schematic diagram for explaining a first example of a use method of the biofuel cell according to the third embodiment of this invention.

As shown in FIG. 30, mesh electrodes 71 and 72 may be formed on the cathode current collector 51 and the anode current collector 52, respectively, of this biofuel cell. In this case, the external air enters the oxidant supply ports 51b of the cathode current collector 51 via the holes of the mesh electrode 71, and the fuel enters the fuel tank 57 from the fuel supply port 58a of the lid 58 after passing through the holes of the mesh electrode 72.

Figure 31:
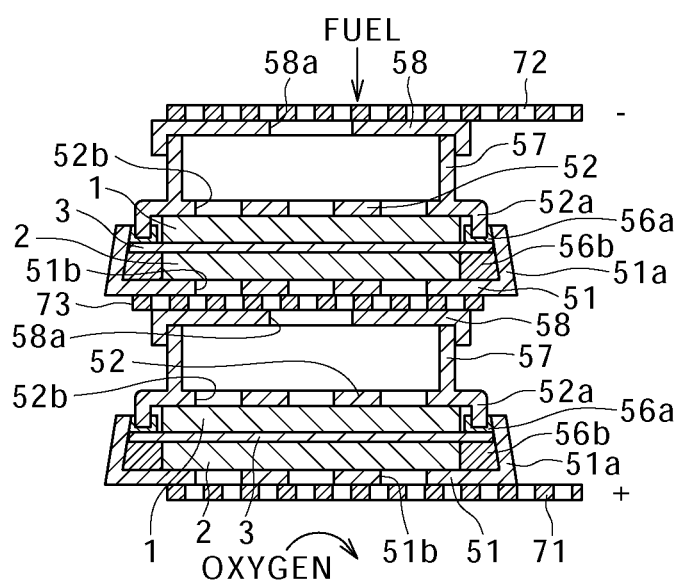
FIG. 31 is a schematic diagram for explaining a second example of the use method of the biofuel cell according to the third embodiment of this invention.

FIG. 31 shows the case in which two biofuel cells are connected in series. In this case, a mesh electrode 73 is sandwiched between the cathode current collector 51 of one biofuel cell (in the diagram, the upper biofuel cell) and the lid 58 of the other biofuel cell (in the diagram, the lower biofuel cell). In this case, the external air enters the oxidant supply ports 51b of the cathode current collector 51 via the holes of the mesh electrode 73. It is also possible to supply the fuel by using a fuel supply system.

Figure 32:
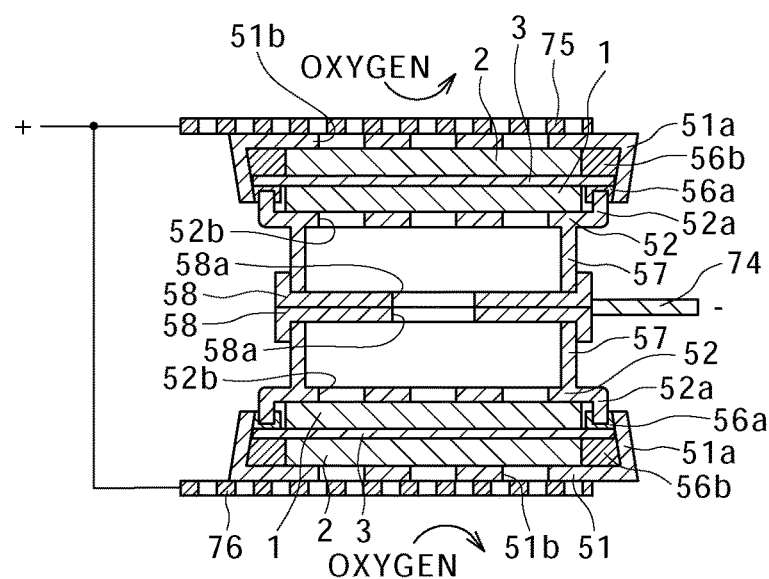
FIG. 32 is a schematic diagram for explaining a third example of the use method of the biofuel cell according to the third embodiment of this invention.

FIG. 32 shows the case in which two biofuel cells are connected in parallel. In this case, the fuel tank 57 of one biofuel cell (in the diagram, the upper biofuel cell) and the fuel tank 57 of the other biofuel cell (in the diagram, the lower biofuel cell) are brought into contact with each other in such a way that the fuel supply ports 58a of the lids 58 of them correspond with each other. An electrode 74 is drawn out from the side surfaces of these fuel tanks 57. Furthermore, mesh electrodes 75 and 76 are formed on the cathode current collector 51 of the above-described one biofuel cell and the cathode current collector 51 of the above-described other biofuel cell, respectively. These mesh electrodes 75 and 76 are connected to each other. The external air enters the oxidant supply ports 51b of the cathode current collectors 51 via the holes of the mesh electrodes 75 and 76.

According to this third embodiment, in a biofuel cell that is a coin type or a button type if the fuel tank 57 is removed therefrom, the same advantages as those by the first embodiment can be achieved. Furthermore, in this biofuel cell, the cathode 2, the electrolyte layer 3, and the anode 1 are sandwiched between the cathode current collector 51 and the anode current collector 52, and the fringe of the outer circumferential part 51a of the cathode current collector 51 is swaged to the outer circumferential part 52a of the anode current collector 52 with the intermediary of the gasket 56a. Thereby, in this biofuel cell, the respective constituent elements can be brought into tight contact with each other uniformly. Thus, variation in the power output can be prevented. In addition, the leakage of the cell solution such as the fuel and the electrolyte from the interfaces among the respective constituent elements can be prevented. Furthermore, the manufacturing steps of this biofuel cell are simple. In addition, size reduction of this biofuel cell is easy. Moreover, for this biofuel cell, a glucose solution or the starch is used as the fuel, and a pH around 7 (neutral) is selected as the pH of the electrolyte used. Thereby, the biofuel cell is safe even if, perchance, the fuel or the electrolyte is leaked to the external.

Furthermore, for the air cell currently put into practical use, the fuel and the electrolyte need to be added at the time of manufacturing, and it is difficult to add them after the manufacturing. In contrast, for this biofuel cell, it is possible to add the fuel and the electrolyte after manufacturing. Therefore, the biofuel cell is easier to manufacture compared with the air cell currently put into practical use.

Next, a biofuel cell according to a fourth embodiment of this invention will be described below.

Figure 33:
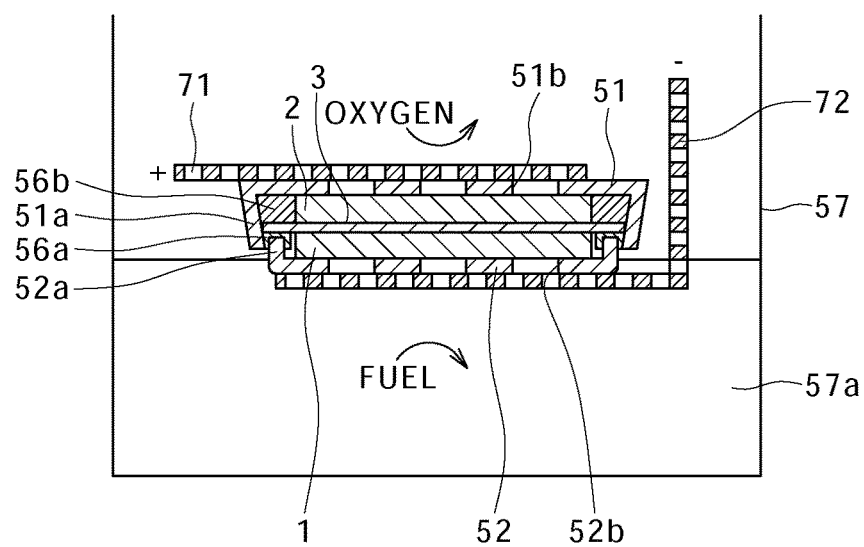
FIG. 33 is a schematic diagram showing a biofuel cell according to a fourth embodiment of this invention and a use method thereof.

As shown in FIG. 33, in this fourth embodiment, a biofuel cell is used that is obtained by removing the fuel tank 57 provided monolithically with the anode current collector 52 from the biofuel cell according to the third embodiment and forming mesh electrodes 71 and 72 on the cathode current collector 51 and the anode current collector 52, respectively. This biofuel cell is used in such a state as to be floated on a fuel 57a put in an open fuel tank 57 with the side of the anode 1 down and the side of the cathode 2 up.

The characteristics of this fourth embodiment other than the above-described ones are the same as those of the first and third embodiments unless they go against the property thereof.

According to this fourth embodiment, the same advantages as those by the first and third embodiments can be achieved.

Next, a biofuel cell according to a fifth embodiment of this invention will be described below. Whereas the biofuel cell according to the third embodiment is a coin type or a button type, this biofuel cell is a cylinder type.

Figure 35:
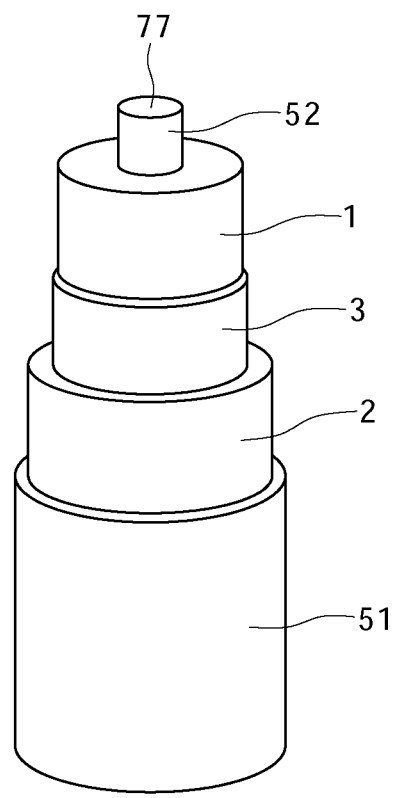
FIG. 35 is an exploded perspective view showing the biofuel cell according to the fifth embodiment of this invention.

FIG. 34(A), FIG. 34(B), and FIG. 35 show this biofuel cell. FIG. 34(A) is a front view of this biofuel cell. FIG. 34(B) is a longitudinal sectional view of this biofuel cell. FIG. 35 is an exploded perspective view showing the respective constituent elements of this biofuel cell in an exploded manner.

As shown in FIG. 34(A), FIG. 34(B), and FIG. 35, in this biofuel cell, an anode current collector 52, an anode 1, an electrolyte layer 3, a cathode 2, and a cathode current collector 51 each having a cylindrical shape are sequentially provided over the outer circumference of a fuel holder 77 having a column shape. In this case, the fuel holder 77 is formed of the space surrounded by the cylindrical anode current collector 52. One end of this fuel holder 77 protrudes to the outside, and a lid 78 is attached to this one end. In the anode current collector 52 on the outer circumference of the fuel holder 77, plural fuel supply ports 52b are formed in the whole of the surface thereof, although diagrammatical representation thereof is omitted. Furthermore, the electrolyte layer 3 is in the form of a bag enveloping the anode 1 and the anode current collector 52. The part between the electrolyte layer 3 and the anode current collector 52 on one end of the fuel holder 77 is sealed by e.g. a seal member (not diagrammatically shown) or the like, which prevents the leakage of the fuel from this part to the outside.

In this biofuel cell, the fuel and the electrolyte are put in the fuel holder 77. These fuel and electrolyte pass through the fuel supply ports 52b of the anode current collector 52 to reach the anode 1, and permeate the pore part of this anode 1 to thereby be accumulated inside this anode 1. To increase the amount of fuel that can be accumulated inside the anode 1, it is preferable that the porosity of the anode 1 be set equal to or higher than 60% for example. However, the anode 1 is not limited thereto.

In this biofuel cell, a gas-liquid separating layer may be provided on the outer circumferential surface of the cathode current collector 51 for durability enhancement. As the material of this gas-liquid separating layer, e.g. a waterproof, moisture-permeable material (material made by combining a film arising from stretch processing of polytetrafluoroethylene and a polyurethane polymer) (e.g. GORE-TEX (commercial product name) made by W. L. Gore & Associates, Inc.) is used. To make the respective constituent elements of this biofuel cell be brought into tight contact with each other uniformly, preferably elasticized rubber (both a band form and a sheet form are possible) having a mesh structure through which the air can pass from the outside is wound outside or inside this gas-liquid separating layer to tighten the whole of the constituent elements of this biofuel cell.

The characteristics of this fifth embodiment other than the above-described ones are the same as those of the first and third embodiments unless they go against the property thereof.

According to this fifth embodiment, the same advantages as those by the first and third embodiments can be achieved.

Next, a biofuel cell according to a sixth embodiment of this invention will be described below.

In this biofuel cell, starch, which is a polysaccharide, is used as the fuel. Furthermore, in association with the use of the starch as the fuel, glucoamylase as a degrading enzyme that breaks down the starch into glucose is also immobilized to an anode 11.

In this biofuel cell, when starch is supplied to the side of the anode 1 as the fuel, this starch is hydrolyzed to glucose by the glucoamylase, and furthermore this glucose is broken down by glucose dehydrogenase. In linkage with the oxidation reaction in this breakdown process, $NAD^+$ is reduced and NADH is produced. This NADH is oxidized by diaphorase to be separated into two electrons, $NAD^+$, and $H^+$. Thus, two electrons and two $H^+$ are produced by one stage of oxidation reaction per one glucose molecule. By two stages of oxidation reaction, four electrons and four $H^+$ are produced in total. The electrons thus generated are passed to the electrode 11 of the anode 1, and the $H^+$ are moved to the cathode 2 via the electrolyte layer 3. At the cathode 2, this $H^+$ reacts with oxygen supplied from the external and the electron sent from the anode 1 via the external circuit to produce $H_2O$.

The characteristics other than the above-described ones are the same as those of the biofuel cell according to the first embodiment.

According to this sixth embodiment, the same advantages as those of the first embodiment can be achieved. In addition, due to the use of the starch as the fuel, an advantage that the amount of electricity generation can be increased compared with the case of using glucose as the fuel can be achieved.

The embodiments of this invention have been specifically described above. However, this invention is not limited to the above-described embodiments but various kinds of modifications based on the technical thought of this invention are possible.

For example, numerical values, structures, configurations, shapes, and materials cited in the above-described embodiments are merely examples, and numerical values, structures, configurations, shapes, and materials different from them may be used according to need.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

According to this invention, a fuel cell that can stably achieve a high current value by optimization of the amount of water contained in the cathode can be realized. Furthermore, by using this excellent fuel cell, high-performance electronic apparatus and so on can be realized.

The invention claimed is:

1. A fuel cell comprising:
  a structure including a cathode, an anode, and a proton conductor that includes an electrolyte layer and that is formed between the cathode and the anode,
  wherein the cathode is a porous carbon-based material having an electron mediator and an enzyme immobilized in direct contact thereon,
  wherein after the electron mediator and the enzyme have been immobilized directly on the cathode, a water-repellant material including microparticles is formed on the cathode by immersing the cathode in a water-repellant agent including 13-18% of a carbon powder that is natural graphite, 3-8% of polyvinyl butyral as a binder, and an organic solvent having a solubility of the enzyme of less than 1 mg/ml such that the electron mediator and the enzyme are positioned between the porous carbon-based material of the cathode and the outer water-repellant material,
  wherein a particle size of the carbon powder is sufficiently smaller than a pore size of the cathode such that an inside of the pores can be coated with the water-repellant material, and
  wherein the electrolyte layer has a charge of a same sign as that of a charge of an oxidized from or a reduced form of the electron mediator.

2. The fuel cell according to claim 1, wherein a fuel solution is in contact with part of the cathode.

3. The fuel cell according to claim 2, wherein the fuel solution is in contact with an outer circumferential surface of the anode and a side surface of the cathode.

4. The fuel cell according to claim 3, wherein a sheet composed of a material through which air passes and the fuel solution does not pass is provided on a surface of the cathode on an opposite side to the proton conductor.

5. The fuel cell according to claim 4, wherein the proton conductor is formed of a nonwoven fabric.

6. The fuel cell according to claim 1, wherein the enzyme includes an oxygen reductase.

7. The fuel cell according to claim 6, wherein the oxygen reductase is bilirubin oxidase.

8. The fuel cell according to claim 6, wherein an enzyme is immobilized to the anode and the enzyme immobilized to the anode includes an oxidase and promotes oxidation of a monosaccharide to break down the monosaccharide.

9. The fuel cell according to claim 8, wherein the enzyme immobilized to the anode includes a coenzyme oxidase that returns a coenzyme reduced in linkage with oxidation of the monosaccharide to an oxidized form and passes an electron to the anode via the electron mediator.

10. The fuel cell according to claim 1, wherein the porous carbon-based material of the cathode is selected from the group consisting of a carbon pellet, carbon felt and carbon paper.

11. The fuel cell according to claim 1, wherein the enzyme is an oxygen reductase selected from the group consisting of bilirubin oxidase, laccase, ascorbic acid and oxidase.

12. An electronic apparatus comprising one or a plurality of fuel cells, at least one of the fuel cells having a structure including a cathode, an anode, and a proton conductor that includes an electrolyte layer and that is formed between the cathode and the anode, wherein the cathode is a porous carbon-based material, wherein an electron mediator is immobilized to the cathode in addition to the enzyme having an electron mediator and an enzyme immobilized in direct contact thereon, wherein after the electron mediator and the enzyme have been immobilized directly on the cathode, a water-repellant material including microparticles is formed on the cathode by immersing the cathode in a water-repellant agent including 13-18% of a carbon powder that is natural graphite, 3-8% of polyvinyl butyral as a binder, and an methyl isobutyl ketone as solvent having a solubility of the enzyme of less than 1 mg/ml such that the electron mediator and the enzyme are positioned between the porous carbon-based material of the cathode and the outer water-repellant material, wherein a particle size of the carbon powder is sufficiently smaller than a pore size of the cathode such that an inside of the pores can be coated with the water-repellant material, and wherein the electrolyte layer has a charge of a same sign as that of a charge of an oxidized form or a reduced form of the electron mediator.

13. The electronic apparatus according to claim 12, wherein the porous carbon-based material of the cathode is selected from the group consisting of a carbon pellet, carbon felt and carbon paper.

14. The electronic apparatus according to claim 12, wherein the enzyme is an oxygen reductase selected from the group consisting of bilirubin oxidase, laccase, ascorbic acid and oxidase.

* * * * *